United States Patent
Mathers

(10) Patent No.: US 12,196,085 B2
(45) Date of Patent: Jan. 14, 2025

(54) MULTI-CHAMBER CONFIGURATION FOR HYDRAULIC VANE DEVICE

(71) Applicant: Mathers Hydraulics Technologies Pty Ltd, Bridgeman Downs (AU)

(72) Inventor: Norman Ian Mathers, Brisbane (AU)

(73) Assignee: Mathers Hydraulics Technologies Pty Ltd, Bridgeman Downs (AU)

( * ) Notice: Subject to any disclaimer, the term of this patent is extended or adjusted under 35 U.S.C. 154(b) by 0 days.

(21) Appl. No.: 18/026,521

(22) PCT Filed: Sep. 10, 2021

(86) PCT No.: PCT/AU2021/051053
§ 371 (c)(1),
(2) Date: Mar. 15, 2023

(87) PCT Pub. No.: WO2022/056582
PCT Pub. Date: Mar. 24, 2022

(65) Prior Publication Data
US 2023/0392501 A1    Dec. 7, 2023

Related U.S. Application Data

(60) Provisional application No. 63/079,842, filed on Sep. 17, 2020.

(51) Int. Cl.
F01C 21/10     (2006.01)
F04C 15/06     (2006.01)

(52) U.S. Cl.
CPC ............ F01C 21/106 (2013.01); F04C 15/06 (2013.01)

(58) Field of Classification Search
CPC .... F01C 21/106; F01C 21/0809; F04C 15/06; F04C 2/3446; F04C 2240/30; F04C 2/3447; F04C 2250/30; F03C 2/304; Y02E 10/72; Y02E 60/16; Y02E 70/30; F03D 15/20; F03D 9/17; F03D 9/28; F05B 2260/406

See application file for complete search history.

(56) References Cited

U.S. PATENT DOCUMENTS 3,652,189 A * 3/1972 Gowie ................... F03C 2/304
                                                       418/150
3,672,797 A * 6/1972 Gerlach et al. ......... F01C 1/344
                                                       418/175

(Continued)

FOREIGN PATENT DOCUMENTS

CN    102297130         12/2011
CN    108894828 A       11/2018

(Continued)

OTHER PUBLICATIONS

Translation JP-2017166357-A (Year: 2024).*
"International Application Serial No. PCT AU2021 051053, International Preliminary Report on Patentability mailed Mar. 30, 2023", 9 pgs.
"International Application Serial No. PCT/AU2021/051053, International Search Report mailed Oct. 28, 2021", 5 pgs.

(Continued)

*Primary Examiner* — J. Todd Newton
(74) *Attorney, Agent, or Firm* — Schwegman Lundberg & Woessner, P.A.

(57) ABSTRACT

Systems and apparatuses are disclosed that comprise or utilize a hydraulic vane device. This device can be configured with a ring and/or a rotor shaped and positioned relative to one another to provide the hydraulic vane device with four or more chambers in which the vanes of the device can work a hydraulic fluid.

16 Claims, 12 Drawing Sheets

(56) References Cited

U.S. PATENT DOCUMENTS

| | | | |
|---|---|---|---|
| 8,602,757 | B2 | 12/2013 | Patterson |
| 9,719,351 | B2 * | 8/2017 | Landrum ............ F01C 21/0881 |
| 11,994,094 | B2 | 5/2024 | Mathers |
| 2005/0042126 | A1 | 2/2005 | Shinoda et al. |
| 2006/0104847 | A1 | 5/2006 | Shinoda et al. |
| 2006/0133946 | A1 * | 6/2006 | Mathers ................ F04C 2/3447 |
| | | | 418/122 |
| 2008/0310988 | A1 * | 12/2008 | Mathers ................ F04C 2/3446 |
| | | | 418/268 |
| 2015/0017050 | A1 | 1/2015 | Landrum |
| 2015/0300174 | A1 | 10/2015 | Schevets |
| 2018/0010676 | A1 * | 1/2018 | Mathers .................. F16D 31/00 |

FOREIGN PATENT DOCUMENTS

| | | | |
|---|---|---|---|
| CN | 116324170 | | 6/2023 |
| GB | 2109467 | A | 6/1983 |
| IN | 202317023967 | | 11/2023 |
| JP | 2011144836 | A | 7/2011 |
| JP | 2017166357 | A * | 9/2017 |
| WO | WO-2015164261 | A1 | 10/2015 |
| WO | WO-2021113907 | A1 | 6/2021 |
| WO | WO-2022056582 | A1 | 3/2022 |

OTHER PUBLICATIONS

"International Application Serial No. PCT/AU2021/051053, Written Opinion mailed Oct. 28, 2021", 7 pgs.

"European Application Serial No. 21867939.7, Response filed Sep. 21, 2023 to Communication pursuant to Rules 161(2) and 162 EPC mailed Apr. 25, 2023", 13 pgs.

"U.S. Appl. No. 17/783,172, Response filed Jan. 2, 2024 to Non Final Office Action mailed Oct. 2, 2023", 13 pgs.

"U.S. Appl. No. 17/783,172, Notice of Allowance mailed Jan. 24, 2024", 7 pgs.

"Chinese Application Serial No. 202080085463.6, Response filed Jul. 17, 2024 to Office Action mailed Apr. 1, 2024", w current English claims, 25 pgs.

"Chinese Application Serial No. 202080085463.6, Office Action mailed Aug. 6, 2024", w English translation, 14 pgs.

"Chinese Application Serial No. 202080085463.6, Response filed Aug. 28, 2024 to Office Action mailed Aug. 6, 2024", w o English Claims, 17 pgs.

"Chinese Application Serial No. 202080085463.6, Office Action mailed Apr. 1, 2024", w English translation, 17 pgs.

"European Application Serial No. 20900159.3, Response filed Jun. 6, 2024 to Extended European Search Report mailed Nov. 27, 2023", 7 pgs.

* cited by examiner

MULTI-CHAMBER CONFIGURATION FOR HYDRAULIC VANE DEVICE

CLAIM OF PRIORITY

This patent application is a U. S. National Stage Filing under 35 U.S.C. 371 from International Application No. PCT/AU2021/051053, filed on Sep. 10, 2021, and published as WO 2022/056582 on Mar. 24, 2022, which application claims the benefit of priority to U.S. Provisional Application Ser. No. 63/079,842, filed Sep. 17, 2020, which are incorporated by reference herein in their entireties.

CROSS REFERENCE TO RELATED APPLICATIONS

The present application is related to international application no. PCT/AU2016/050967, publication no. WO/2017/066826, United States publication no. US/2018/0298881, entitled "Turbine Power Storage and Regeneration" filed Oct. 14, 2016; international application no. PCT/IB2010/003161, publication no. WO/2011/061630, United States publication no. US/2013/0067899A1 entitled "Hydrostatic torque converter and torque amplifier" filed Nov. 19, 2010; international application no. PCT/AU2007/000772, publication no. WO/2007/140514, United States publication no. US/2010/0028181A1 entitled "Vane Pump for Pumping Hydraulic Fluid," filed Jun. 1, 2007; international application no. PCT/AU2006/000623, publication no. WO/2006/119574, United States publication no. US/2008/0310988A1, entitled "Improved Vane Pump," filed May 12, 2006; international application no. PCT/AU2004/00951, publication no. WO/2005/005782, United States publication no. US/2006/0133946A1, entitled "Hydraulic Machine," filed Jul. 15, 2004; U.S. patent application Ser. No. 13/510,643, publication no. U.S. 2013/0067899, entitled "Hydraulically Controlled Rotator Couple," filed Dec. 5, 2012; international application no. PCT/AU2020/050389, application as yet unpublished, entitled TIDAL POWER HARNESSING, STORAGE AND REGENERATION SYSTEM AND METHOD," filed Apr. 22, 2020; and U.S. Provisional Patent Application Ser. No. 62/945,946, entitled "HYDRAULIC DEVICE CONFIGURED AS A STARTER MOTOR", filed Dec. 10, 2019, the entire specification of each of which is incorporated herein by reference in entirety.

TECHNICAL FIELD

This document pertains generally, but not by way of limitation, to a hydraulic device, and more particularly, a hydraulic vane device that includes a multi-chamber ring.

BACKGROUND

Rotary couplings are utilized in vehicles, industrial machines, and marine applications to transmit rotating mechanical power. For example, they have been used in automobile transmissions as an alternative to a mechanical clutch. Use of rotary couplings is also widespread in applications where variable speed operation and controlled startup without shock loading of the power transmission system is desired.

Rotary couplings can also be used for power generation that can include a turbine to harness tidal and/or wind energy for conversion to electrical power. Many turbine systems include a gearbox and/or a mechanical brake for reducing the energy input to the generator, for instance, to prevent the generator from exceeding a maximum power rating. In one example, the total power input into an electrical grid must be substantially equal to the total electrical demand on the system in order to maintain a desired frequency of the electrical grid. Accordingly, existing turbines can reduce the energy input into the generator (by the application of mechanical brakes, adjusting the gear ratio of the gearbox, or adjusting the pitch of the turbine blades) to prevent an increase in frequency of the electrical grid. As a result, some turbines fail to convert the full potential tidal and/or wind energy into electrical power when the energy input exceeds the maximum power rating of the generator.

OVERVIEW

Various apparatuses, systems and methods are disclosed that can utilize a hydraulic device or a plurality of hydraulic devices. The hydraulic device(s) disclosed herein can optionally be configured to be operable as a starter motor. The hydraulic device(s) can also configured to be operable a hydrostatic coupling and as a vane pump.

The present inventor has recognized that traditional torque converters slip when subjected to high torque and low or no travel speed, such as when a backhoe drives forward and uses its bucket to break into a heap of material. Slippage can waste energy, lowering efficiency and creating high heat. Traditional hydrostatic drives are designed to provide a minimum displacement when operating as a pump and a maximum displacement when operating as a motor. Again, such operation characteristics can have low efficiency.

Hydraulic devices utilizing vanes sometimes called hydraulic vane devices, vane pumps, power split couplings or vane couplings have been developed. For simplicity such devices with vanes are simply referred to as hydraulic devices in some instances herein. These devices can offer improved power density and service life as compared to traditional variable piston pump/motor hydraulic devices and indeed even standard vane pumps.

The present inventor has recognized hydraulic vane devices that have multi-chambers defined between a ring and rotor. As used herein, the term multi-chambers, multi-chamber or multiple chamber refers to a configuration with at least four chambers. However, designs with five, six, seven, eight, nine, ten or even more chambers are contemplated. Such multi-chamber hydraulic vane device can provide a smoother torque transfer than a traditional hydraulic vane device, which traditionally has two chambers for the ring. For example, the hydraulic vane device with four chambers will having a timing to get twelve pressure ripples as compared with six pressure ripples for a device with two chambers. Additionally, a multi-chamber hydraulic vane device can allow for greater ease of oil/fluid replacement into each the chambers as there are more opportunities when torque falls to change oil/fluid over in the short time period available (fractions of a second typically). This configuration can also provide more opportunity for venting each chamber with fresh fluid/oil from a charged accumulator or other fluid repository.

The present inventor has also recognized that under certain operation conditions (e.g., breaking into the heap, dumping, accommodating high speed wind turbine operation, etc.), hydraulic vane devices that have multi-chambers can provide a higher degree of traction as compared with the traditional hydraulic vane device (or other traditional torque coupling). Higher traction can be desirable to keep from spinning the wheels of the vehicle unnecessarily or have shaft(s) slip Eliminating or reducing unnecessary spinning of wheels can provide a serious fuel and tire saver for the vehicle.

The present inventor has also recognized hydraulic systems where multiple hydraulic vane devices can be utilized. Some or all of these hydraulic vane devices can have multi-chambers. Each hydraulic device can have different displacements as a result of the chambers being different sizes. This can improve hydraulic flexibility of the system as each device and/or chamber can provide for a different displacement. For example, the system can switch to one chamber of appropriate size and pressure as the pressure rises therein to help charge an accessory such as an accumulator. According to another example, two or more chambers (from different devices or on the same device) could be utilized simultaneously as pumps for certain operations such as breaking into the heap or dumping the load.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
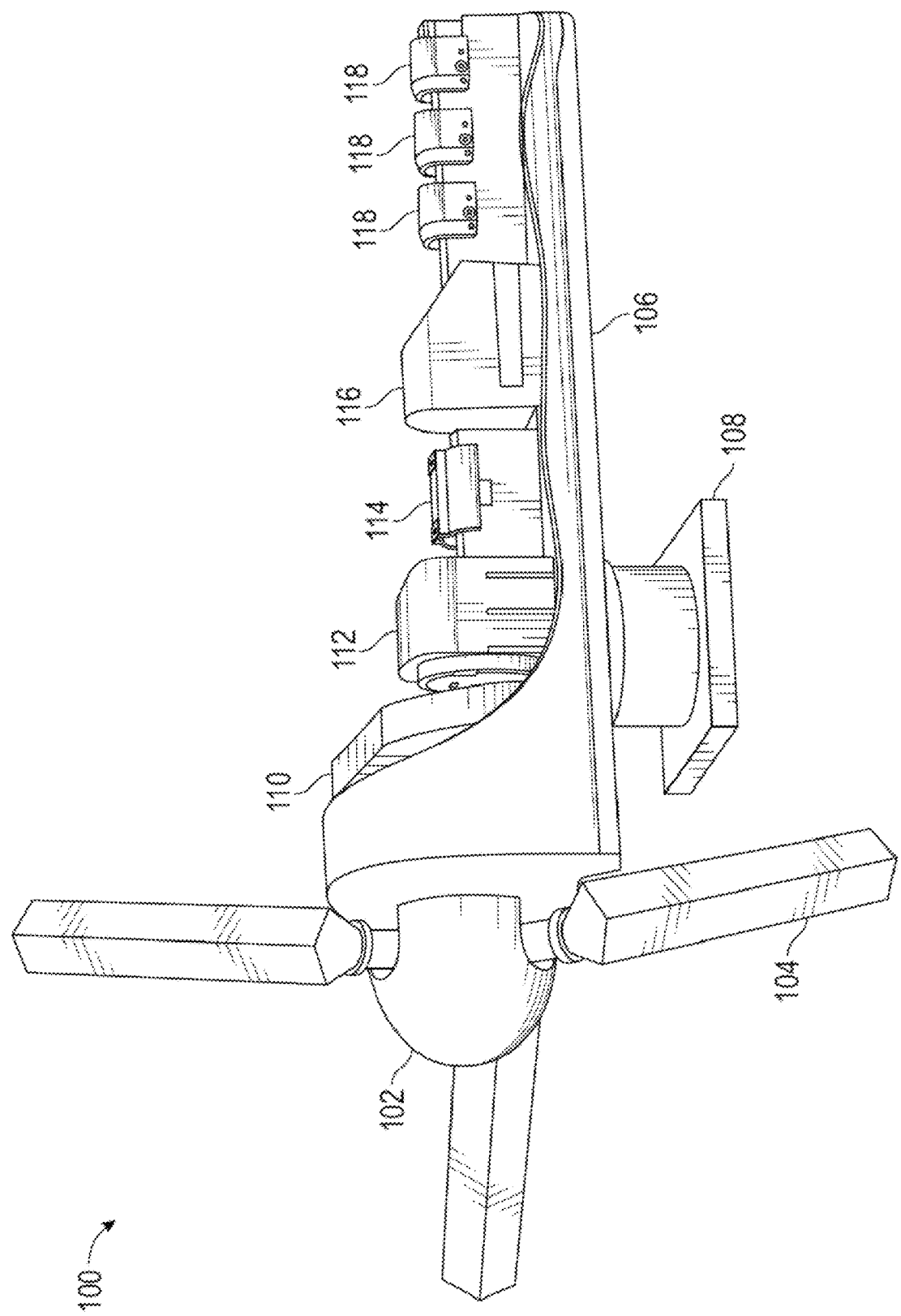
FIG. 1 is a perspective cutaway view of one example of a wind turbine nacelle including a hydraulic device configured as a power split transmission coupling, generator, and a plurality of hydraulic motors.

The present application relates apparatuses, systems and methods that can utilize a hydraulic device or a plurality of hydraulic devices. This hydraulic device or plurality of hydraulic devices can be configured with the multi-chamber configuration as a result of the relative shape and positioning of the rotor and ring as further described and illustrated herein. The hydraulic device(s) can be configured to be operable as a starter motor in the manner discussed in my U.S. Provisional Patent Application Ser. No. 62/945,946, entitled "HYDRAULIC DEVICE CONFIGURED AS A STARTER MOTOR", filed Dec. 10, 2019, the entire specification of which is incorporated herein by reference in its entirety. The hydraulic device(s) can also be configured to be operable as a hydrostatic coupling, as a vane pump and/or as a power split coupling as further described herein and in my prior patent applications discussed and incorporated herein by reference above.

According to some examples, the hydraulic device can be part of a system and can allow the system to operate in various operation modes and accessories. These operation modes can include an accessory operation mode, a vehicle idle/drive mode, a regenerative energy storage mode, a regenerative energy application mode, a vane pumping mode and a startup mode. In some cases, the accessories used with the vehicle systems can comprise valves, a hydraulic pump motor, an accumulator, and various vehicle auxiliary systems that are hydraulically operated. Additional examples contemplate that the fluid communicating interior portions of the system including, for example, the plurality of hydraulic devices, the plurality of accessories, and the transmission can be coated in a diamond or diamond-like carbon. This can allow more environmentally friendly hydraulic fluids such as glycol or water-glycol to be used by the system.

As used herein the term "vehicle" means virtually all types of vehicles such as earth moving equipment (e.g., wheel loaders, mini-loaders, backhoes, dump trucks, crane trucks, transit mixers, etc.), waste recovery vehicles, marine vehicles, industrial equipment (e.g., mining or agricultural equipment), personal vehicles, public transportation vehicles, and commercial road vehicles (e.g., heavy road trucks, semi-trucks, etc.). The present application also relates to systems and techniques for turbine power storage and regeneration that use the hydraulic device(s) as power split coupling. As used herein the term "turbine" unless otherwise described can connote either a wind turbine or a tidal turbine. The following detailed description includes examples intended to be illustrative of the subject matter disclosed herein and are in no way intended to be limiting. Features and steps described in relation to one or more examples may be combined with the subject matter of other examples and methods provided in this disclosure. The following examples are sufficient to enable one of skill in the art to practice the systems and techniques described in the following detailed description.

With regard to wind gusts that occur causing overspeed or indeed tides, which can fluctuate cyclically in velocity and volume, the inventor recognizes limiting the power captured by a turbine rotor where rotor speeds exceed a rated speed (max power rating) of an electrical generator within the turbine, such as for generating electrical power. The present subject matter can help provide a solution to this problem, for instance, by including the hydraulic device acting as a power split transmission coupling within the turbine system. The systems and methods disclosed herein can store energy during a period that turbine rotor velocity is to low or to fast (exceeding the rated speed of the generator). During periods of rotor velocity below the rated speed, the system can operate in a regeneration mode. For instance, the turbine can include one or more motors operatively coupled to the generator. Previously stored energy can be applied to the motor for increasing power generation during periods of below rated speed operation.

In an example, an energy system can include a turbine rotor. The turbine rotor can include one or more blades attached to the turbine rotor. The blades can be configured to produce a rotor torque on the rotor in response to a tidal and/or wind loading applied to the blades. For instance, the blades can include an airfoil shape to rotate the turbine rotor in response to tidal and/or wind loading. A power split transmission coupling can be operatively coupled to the turbine rotor by an input shaft and to a generator by an output shaft. The power split transmission coupling can be configured to transmit the rotor torque to the output shaft at an adjustable torque ratio of the input shaft. The power split transmission coupling can divert hydraulic fluid in response to the output shaft exceeding a threshold power, torque, or angular velocity. By diverting hydraulic fluid, the power transmitted to the generator, and accordingly the power produced by the generator can be adjusted.

A hydraulic fluid storage vessel can be configured to store the diverted hydraulic fluid under pressure. The turbine system can include at least one hydraulic motor. The hydraulic motor can include a motor output configured to receive the hydraulic fluid stored under pressure and generate a torque on the motor output in response. The generator can be operatively coupled to the output shaft and the motor output to produces electrical power in response to at least one of: torque applied by the output shaft, torque applied by the motor output, or both.

FIGS. 1-4, 8 and 9 show various systems that can benefit from the hydraulic vane device with multi-chamber ring or rotor as illustrated in Figures FIGS. 1-4, 8 and 9 are provided for illustrative purposes for the benefit of providing various applications of the hydraulic vane device with the multi-chamber ring or rotor as understood by those of skill in the art.

Figure 3:
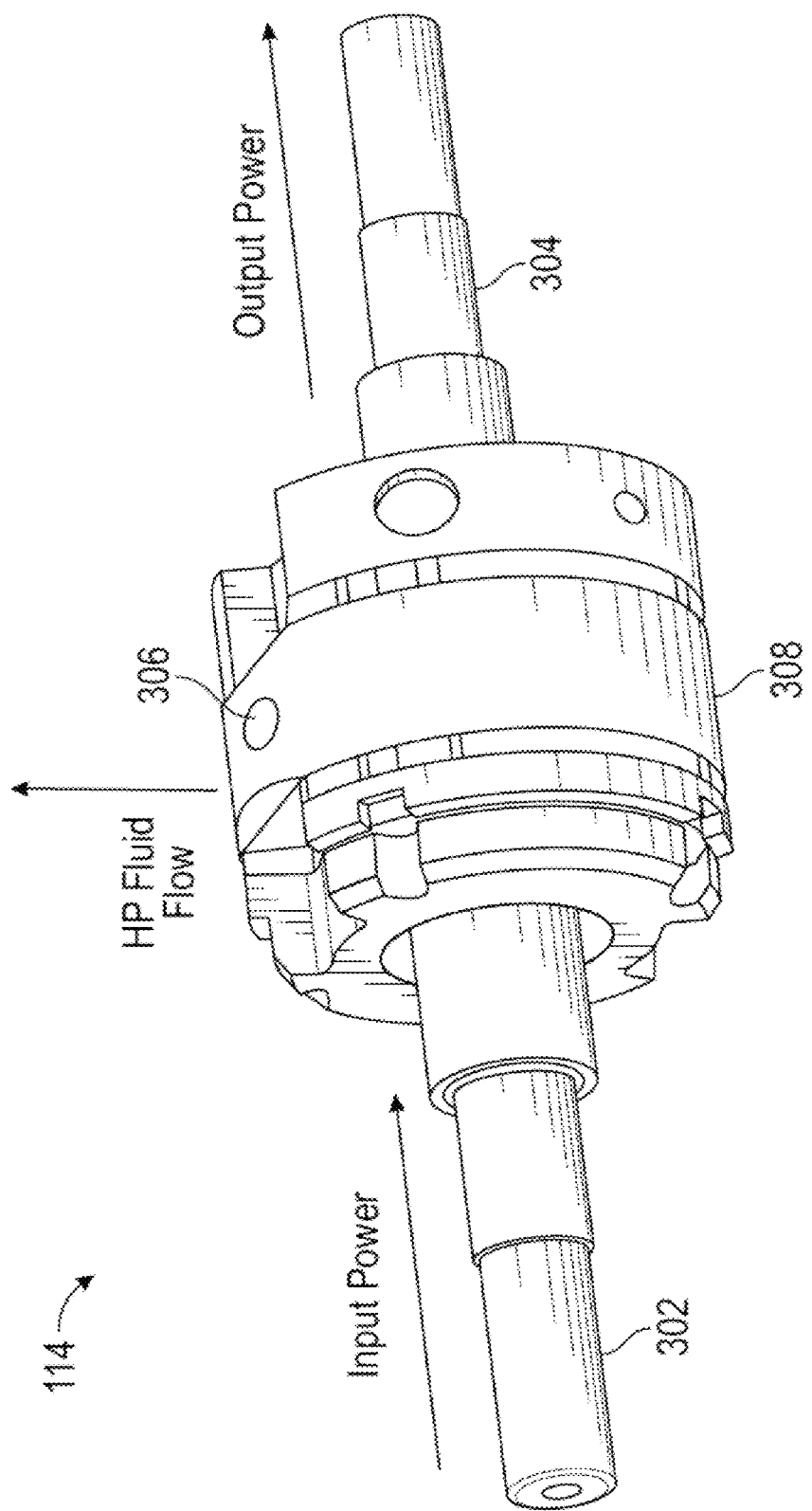
FIG. 3 is a perspective view of a variable power split transmission coupling according to an embodiment.

FIG. 1 shows a cutaway perspective view of an exemplary turbine 100, which can be either a tidal turbine or wind turbine. The turbine 100 can include a turbine rotor 102 and at least one turbine blade 104. The turbine blade 104 can be rotatably coupled to the turbine rotor 102. For instance, the turbine blade 104 can include an airfoil shape and the pitch of the airfoil with respect to a tidal and/or wind stream can be adjustable. The turbine rotor 102 can be mounted to a nacelle 106, for example, by a bearing 110. A tower 108 can support the nacelle 106 in the tidal and/or wind stream at a location sufficiently above the ground to provide clearance for rotation of the turbine blades 104. The nacelle 106 can house, and also support in some examples, a gearbox 112, a power split transmission coupling 114, a generator 116, and at least one hydraulic motor 118. The turbine blade 106 can generate a torque in response to a tidal and/or wind loading and transmit that torque to the turbine rotor 102. The turbine rotor 102 can transmit the torque generated by the turbine blade 104 to the generator 116. Electrical power can be produced by the generator 116 in response to the application of torque to a generator rotor 120 resulting in a rotation of the generator rotor within a stator of the generator 116. The turbine rotor 102 can be coupled to the generator 116 by one or more linkages (rotary shafts). The gearbox 112 and the power split transmission coupling 114 can be operatively coupled to the one or more linkages between the turbine rotor 102 and the generator 116. For instance, the turbine rotor can include a turbine rotor shaft. The gearbox 112 can include an input coupling attached to the turbine rotor shaft and an output coupling. The gearbox 112 can include one or more sprockets and gears arranged to rotate the output coupling at a speed corresponding to a ratio of the rotational speed of the input coupling (i.e., the turbine rotor shaft). In other words, the gearbox 112 can rotate the output coupling at a faster, slower, or equal speed of the turbine rotor shaft. The one or more linkages can further include an input shaft 122 of the power split transmission coupling 114 (as shown in FIG. 3 and described herein). The power split transmission coupling 114 can divert hydraulic fluid under high pressure to a storage vessel. The hydraulic fluid stored under high pressure can be used for auxiliary power purposes including, but not limited to, supplying high pressure hydraulic fluid to a hydraulic motor 118 for power generation or regeneration, pumping fluid, supplying cooling fluid to components of the turbine 100, or the like.

Figure 4:
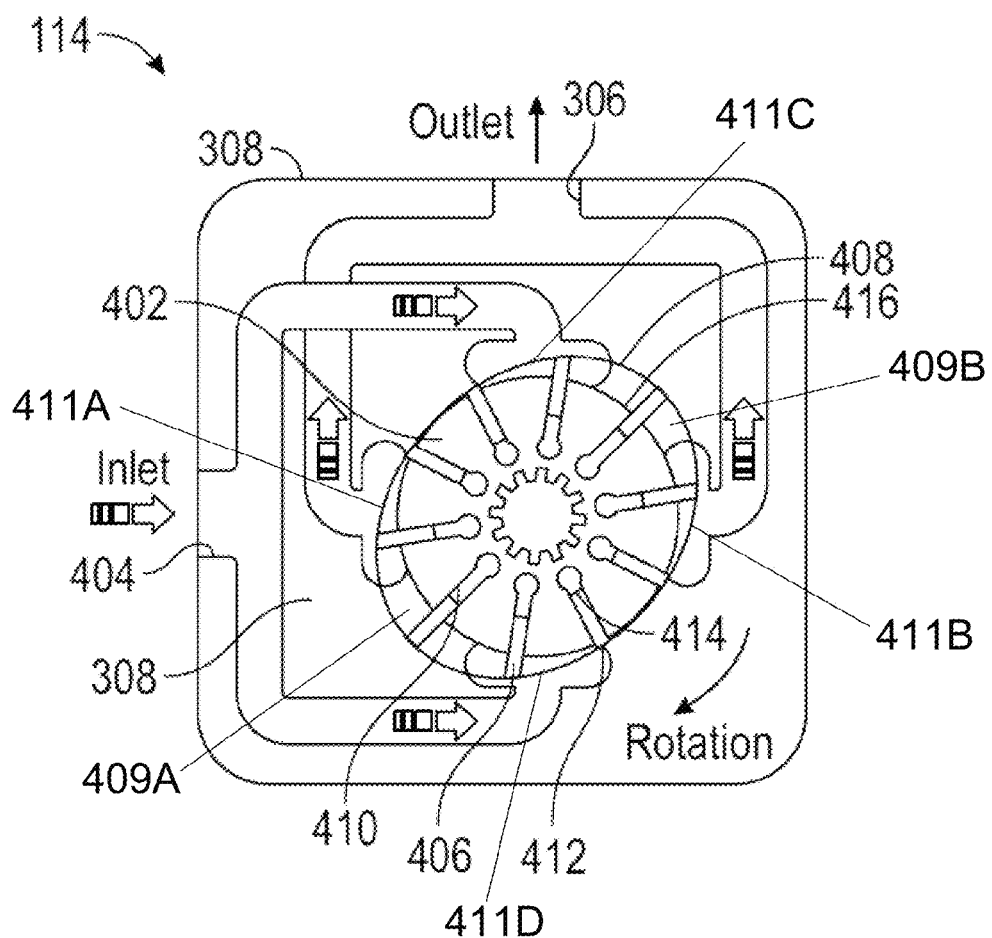
FIG. 4 is a cross section view of an exemplary power split transmission coupling as is known in the prior art.

The hydraulic motor 118 can also be coupled to the generator rotor 120 for supplying increased torque and power to the generator 116. In the example of FIG. 1, the turbine 100 includes three hydraulic motors 118 and one of the hydraulic motors 118 is capable of operating at a variable displacement. In an example, a plurality of hydraulic motors 118 can be more efficient than a single larger hydraulic motor 118. For instance, where the maximum power output of the hydraulic motor 118 can exceed the maximum power of the generator 116, the hydraulic motor 118 can be de-stroked to operate at lower than maximum capacity. Some hydraulic motors 118 operate less efficiently when de-stroked. The greater the degree of de-stroking, the less efficient the hydraulic motor 118 can operate. In an example, the hydraulic motor 118 can include a similar design to the power split transmission coupling 114 (as shown in FIGS. 3 and 4 and described herein). Instead of diverting hydraulic fluid to reduce the torque delivered to the generator 116, the hydraulic motor 118 can produce torque on the generator rotor 120 in response to the application high pressure hydraulic fluid to the rotor hub and vanes of the hydraulic motor 118.

Figure 2:
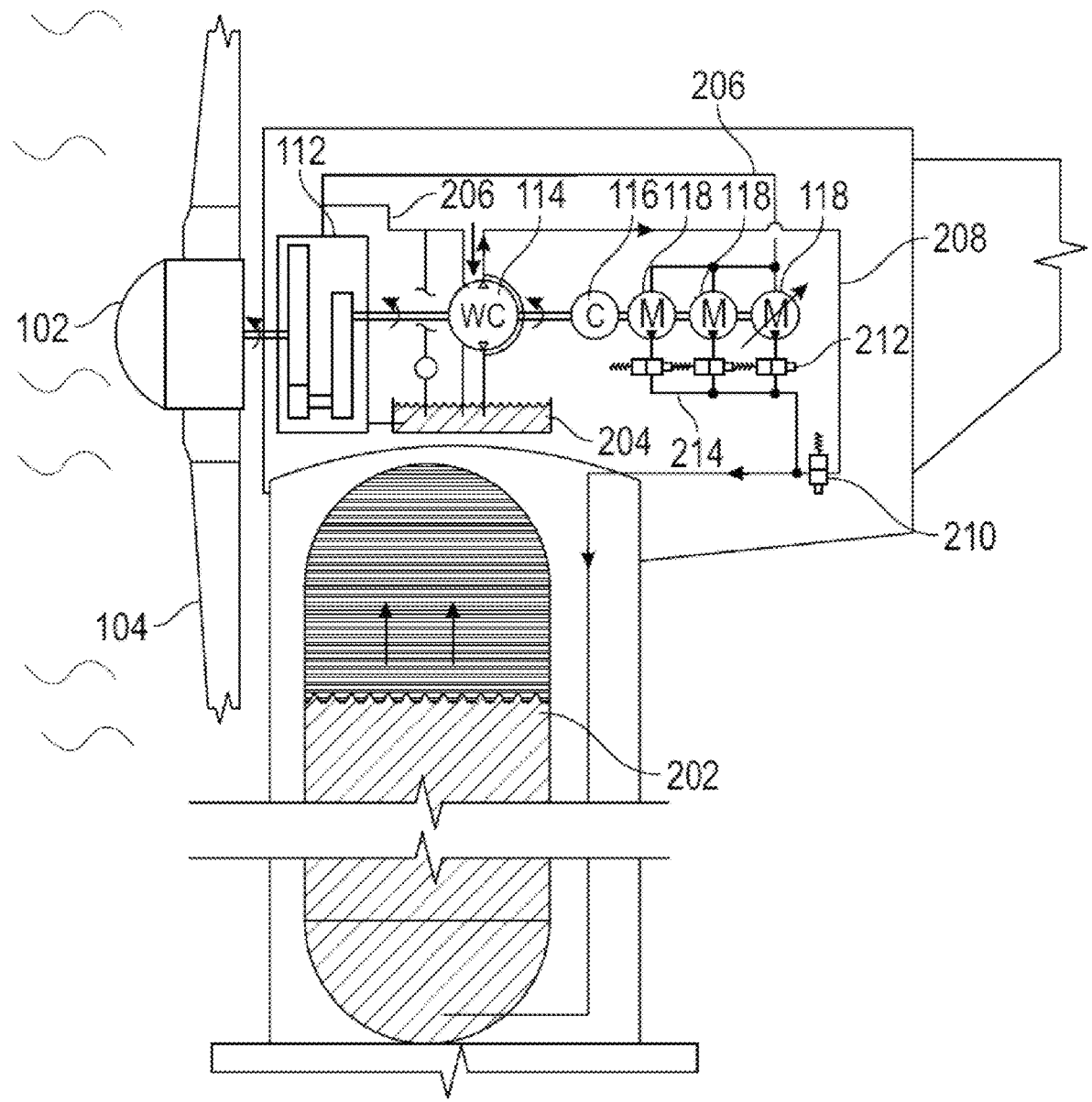
FIG. 2 is a system diagram of a wind turbine including a power split transmission coupling for regeneration according to an embodiment.

FIG. 2 depicts a turbine system diagram according to an example of the turbine 100. The turbine 100 can include the turbine rotor 102, turbine blades 104, gearbox 112, power split transmission coupling 114, generator 116, and a plurality of hydraulic motors as previously described herein. The example, of FIG. 2 further includes a hydraulic storage vessel 202, a hydraulic fluid reservoir 204, and a cooling circuit 206. Where the mechanical power of the turbine rotor 102 exceeds the maximum power of the generator 116, the power split transmission coupling 114 can draw hydraulic fluid from the reservoir 204 into the power split transmission coupling 114 and divert the hydraulic fluid at high pressure to the hydraulic storage vessel 202. The power split transmission coupling 114 can include an inlet port and outlet port (as shown in FIG. 3 and described herein). The inlet port can be coupled to the reservoir 204 to communicate the hydraulic fluid from the reservoir 204 to the power split transmission coupling 114. A hydraulic storage conduit 208 can couple the power split transmission coupling 114 to the hydraulic storage vessel 202. The high pressure hydraulic fluid can be stored at high pressure in the storage vessel 202. For instance, high pressure hydraulic fluid can be hydraulic fluid at pressures including, but not limited to, 20 bar, 100 bar, 300 bar, 500 bar, or other pressure. The hydraulic storage conduit 208 can include at least one cutoff valve 210 located along the hydraulic storage conduit between the power split transmission coupling 114 and the hydraulic storage vessel 202. The communication of hydraulic fluid from the power split transmission coupling 114 and the hydraulic storage vessel can be interrupted or stopped where the cutoff valve 210 is in the closed position. Closing the cutoff valve can prevent reverse flow of hydraulic fluid from the hydraulic storage vessel 202 to the power split transmission coupling 114.

In an example, the turbine system 100 includes at least one hydraulic regeneration conduit 214 coupled between the hydraulic storage vessel 202 and at least one hydraulic motor 118. For instance, the hydraulic regeneration conduit 214 can be connected to the hydraulic storage conduit 208 between the hydraulic storage vessel 202 and the cutoff valve 210 as shown in FIG. 2. In the regeneration mode, the turbine 100 can direct hydraulic fluid from the hydraulic storage vessel 202 to the one or more hydraulic motors 118 through the hydraulic regeneration conduit 214. The hydraulic regeneration conduit 214 can include one or more regeneration valves 212. In the open position, high pressure hydraulic fluid can flow from the hydraulic storage vessel to at least one hydraulic motor 118 through the regeneration valve 212. Torque can be supplied to the generator rotor 120 in response to the high pressure hydraulic fluid passing through the hydraulic motor 118.

In an example, the hydraulic fluid can include, but is not limited to water, a water glycol mixture, hydraulic oil, or the like. The power split transmission can operate with water as a fluid medium for transmitting torque from the input shaft to the output shaft resulting in cost savings over more expensive fluids. Couplings, fittings, hoses, conduits, and the like can leak hydraulic fluid in the course of normal operation. The use of water as the hydraulic fluid can result in an environmentally friendly solution. In an example, glycol or ethylene glycol can be added to water to form a water glycol mixture. For instance, the water glycol mixture can include a lower freezing point and a higher boiling point than pure water.

In the example of FIG. 2, the reservoir 204 can include a fluid storage tank for holding the hydraulic fluid at low pressures, such as atmospheric pressure. In an example, the reservoir 204 can include a large body of water, such as an ocean, lake, river, storage pod, tank, or the like. For instance, the large body of water can include a naturally occurring body of water. The reservoir can provide hydraulic fluid for cooling various components of the turbine 100 or for storing the hydraulic fluid at high pressure generated by the power split transmission coupling 114. In an example, where the hydraulic fluid from the reservoir 204 is not stored under high pressure, it can be returned to the reservoir 204. For instance, where the hydraulic fluid is circulated in a cooling circuit (described further below), the hydraulic fluid can be returned to the reservoir 204.

The hydraulic storage vessel 202 can be configured to store high pressure hydraulic fluid for long durations of time. For instance, the hydraulic storage vessel 202 can contain pressures of up to 350 bar for hours, days, weeks, or months. In the example of FIG. 2, the hydraulic storage vessel 202 is a hydraulic accumulator. The accumulator can be charged with a gas or a liquid, such as nitrogen gas or liquid nitrogen, to increase the storage pressure of the accumulator. In an example, the stored hydraulic fluid can provide up to 1 megawatt of power or more.

The cooling circuit 206 can circulate hydraulic fluid (e.g., from the reservoir 204) in a conduit. In the example, shown in FIG. 2, the hydraulic fluid diverted from the power split transmission coupling 114 can be circulated through the cooling circuit 206. The cooling circuit 206 can transfer heat away from the turbine components including, but not limited to, the gearbox 112, power split transmission coupling 114, generator 116, or the like. For instance, the cooling circuit 206 can include one or more heat exchangers to transfer the heat away from the turbine components. In an example, water can be the hydraulic fluid used as a cooling source for the turbine powertrain. In an example, hydraulic fluid exiting the hydraulic motor 118 can circulate through the cooling circuit 206 before returning to the reservoir 204. Optionally, the water can be combined with fire retardants (e.g., foaming agents) for reducing the flammability of the hydraulic fluid. In an example, the hydraulic fluid can be a water glycol mixture with good fire retardant properties. The hydraulic fluid can mitigate damage to the generator 116 and risk of fire and accordingly the generator 116 can be operated at rated power. In an example, hydraulic fluid (e.g., water glycol) can be used to extinguish developing fires. For instance, the cooling circuit 206 can include fire extinguishing nozzles that release the hydraulic fluid to extinguish fire.

FIG. 3 shows a perspective view of an example of the power split transmission coupling 114. As previously described, the power split transmission coupling 114 can include an input shaft 302 and an output shaft 304. The torque applied to the output shaft 304 can be adjusted according to an adjustable torque ratio of the input shaft 302. In an example, the torque of the output shaft 304 can be reduced according to the adjustable torque ratio of the power split transmission coupling 114. Displacing hydraulic fluid through an outlet port 306 of the power split transmission coupling 114 can decrease the adjustable torque ratio (i.e., reduce the amount of torque on the output shaft 304 in relation to the torque of the input shaft 302. A rotor hub (shown in FIG. 4 and described herein) can be fixably attached to the input shaft 302. The rotor hub can be rotatable within the cam ring 308. In an example, the cam ring 308 can be fixably attached to the output shaft 304. The power split transmission coupling 114 can have a through drive mode and a power split mode. In the through drive mode, the rotor hub and the cam ring rotate in a substantially fixed 1:1 ratio (i.e., the output torque is substantially equal to the input torque). The power split mode, the power split transmission coupling 114 can mitigate excess power or shock being applied to the generator. For instance, adjustable torque ratio of the power split transmission coupling 114 can be adjusted so the torque of the output shaft 304 is constant where there can be variation of torque applied to the input shaft 302. In an example, the power split transmission coupling 114 can include a housing. The cam ring 308 and rotor hub 402 can be disposed within the housing. The hydraulic fluid can be included in a cavity between the housing and the cam ring 308, input shaft 302, output shaft 304, or other components for lubrication or coolant.

FIG. 4 is an example of a cross section view of a hydraulic vane device configured as the power split transmission coupling 114 as known in the art. It is understood that the further hydraulic vane devices having the multiple chambers, such as those disclosed in FIGS. 5A-7 herein could be substituted for the power split transmission coupling 114. This can result in improvements to the operation of the turbine system 100 as previously discussed herein.

In FIG. 4, the cross section view is located perpendicular to the input shaft 302 and centered within the rotor hub 402. The cam ring 308 includes the inlet port 404, the outlet port 306, and a cam ring surface 408. The cam ring surface 408 can be an elliptical shape. This elliptical shape can provide the hydraulic vane device with two chambers 409A and 409B. These chambers 409A and 409B are defined by the cam ring surface 408 and the rotor hub 402. The inlet port 404 can extend from the outer portion of the cam ring 308 and divide into two conduits, each extended to opposite quadrants of the cam ring surface 408 in the example shown in FIG. 4. The outlet port 306 can extend from the outer portion of the cam ring 308 and divide into two conduits, each extended to opposite quadrants of the cam ring surface 408 and adjacent to the inlet port quadrants. The inlet port 404 and outlet port 306 can terminate at the cam ring surface 408 forming one or more apertures or ports 411A, 411B, 411C and 411D at least partially defined by the cam ring surface 408. These internal ports defined the cam ring surface 408 communicate with one of the chambers 409A, 409B and are typically referred to as suction and pressure/delivery ports. The suction ports 411A, 411B communicate with the outlet port 306 and the pressure ports 411C, 411D communicate with the inlet port 404. Thus, the hydraulic vane device of FIG. 4 will have two chambers 409A and 409B and four internal ports 411A, 411B, 411C and 411D (two inlet port and two outlet ports) as illustrated in FIG. 4.

In the example of FIG. 4, the elliptical shape of the cam ring 308 can be symmetrical. Symmetry of the cam ring 308 can balance the forces applied to bearings of the power split transmission coupling 114. For instance, bearings supporting the input shaft 302 and the output shaft 304. Balanced forces can extend the life of the power split transmission coupling 114 as mechanical stress and fatigue are reduced.

The rotor hub 402 can be located at the center axis of the cam ring surface 408. As shown in FIG. 4, the rotor hub 402 can include a circular shape sized to fit within the elliptical shape of the cam ring surface 408. For instance, the rotor hub 402 can be sized with a clearance fit to the cam ring surface 408, such as a precision running fit to allow for the rotor hub 402 to rotate within the cam ring 308 with minimal clearance. The rotor hub 402 can include a plurality of circumferentially spaced slots 410 extended radially outward from the center axis of the rotor hub 402. Each slot 410 can be sized and shaped to support a vane 406 therein. The inner portion of the slot 410 can include a signal passage in communication with a high pressure fluid.

As shown in the example of FIG. 4, the vane 406 can be located within the slot 410. The vanes can be extended radially outward from the center axis of the rotor hub 402 in response to the application of the high pressure fluid to the base 414 of the vane 406 through the signal passage. In an example the high pressure fluid can be high pressure hydraulic fluid. A tip 412 of the vane 406 can contact the cam ring surface 408 in a fully extended position. Each vane 406 can extend and retract throughout the rotational cycle of the rotor hub 402. For instance the tip 412 can be substantially flush with the outer surface 416 of the rotor hub 402 in a first orientation of the rotor hub 402 and then be displaced to a partially extended position or a fully extended position as the rotor hub 402 rotates from the start of a first quadrant to the start of the second quadrant. In the retracted position, the input shaft 302 can be independently rotatable with respect to the output shaft 304.

In an example, the tip 412 can include a roller bearing (referred to herein as a roller vane). The roller vane can decrease friction between the vane 406 and the cam ring surface 408 and can be used in a large scale power split transmission coupling 114 (e.g., 200 kilowatts or greater). Where the hydraulic fluid includes an environmentally friendly or non-flammable fluid (such as water glycol), the roller vane can be used to reduce friction between the vane 406 and the cam ring 308. The vane 406 can also include a coating to reduce friction, increase corrosion resistance, or reduce wear. For instance, the vane 406 can include a diamond-carbon coating or diamond-dust coating to improve the corrosion resistance of the vane 406. The coating can be selected from a variety of coatings to reduce friction where a particular hydraulic fluid is used in the power split transmission coupling 114. The diamond-dust coating can reduce corrosion where water glycol is used in the power split transmission coupling 114.

As previously stated, the power split transmission coupling 114 can include a through drive mode and a power split mode. In the through drive mode, the input shaft 302 and the output shaft 304 can include a 1:1 adjustable torque ratio. For instance, the input shaft 302 and the output shaft 304 can rotate together (i.e., at the same angular velocity). The hydraulic fluid between the rotor hub 402 and the cam ring 308 can be pressurized by the power split transmission coupling 114. For instance, where the vane 406 is extended, a pressure can be applied to the hydraulic fluid by the vane 406. Torque is transferred from the rotor hub 402 to the cam ring 308 by the pressurized hydraulic fluid on the cam ring 308. The outlet port 306 can be closed (i.e., deadheading). With the hydraulic fluid trapped within the power split transmission coupling 114, substantially all of the torque from the rotor hub 402 can be transferred to the cam ring 308. The torque applied to the generator 116 can be substantially equal to the torque of the input shaft 302. The power split transmission coupling 114 can operate in the trough drive mode where the power applied to the input shaft 302 is lower than the rated power of the generator 116 (e.g., at low turbine rotor speed). Efficiency of the turbine 100 can be maximized by operating the power split transmission coupling 114 in the through drive mode where the turbine rotor power is below the rated power of the generator 116 (e.g., when tidal and/or wind speed is low).

In the power split mode, the outlet port 306 can be open or partially open. Hydraulic fluid can exit the power split transmission coupling 114 through the outlet port 306. The pressure of the hydraulic fluid between the rotor hub 402 and the cam ring 308 can be reduced as a result of the exiting (diverted) hydraulic fluid. Accordingly, less than substantially all of the input shaft 302 torque can be transferred to the output shaft 304. In an example, the volume between vanes 406 in the inlet quadrants of the cam ring 308 increase as the rotor hub 402 rotates within the cam ring 308. The volume between the vanes 406 in the outlet quadrants of the cam ring 308 decrease as the rotor hub 402 rotates within the can ring 308. The increasing volume in the inlet quadrants draws the hydraulic fluid into the power split transmission coupling 114. For instance, the increasing volume can generate a negative pressure that draws hydraulic fluid into the power split transmission coupling 114. The decreasing volume in the outlet quadrants can increase the pressure of the hydraulic fluid, for instance, by compressing the hydraulic fluid. A portion of the hydraulic fluid in the outlet quadrant can be diverted through the outlet port 306 in response to the power transferred from the input shaft 302 to the output shaft 304 exceeding a threshold level (e.g., a maximum rated generator power). The diverted hydraulic fluid can be stored under pressure (e.g., the pressure at which the hydraulic fluid exits the power split transmission coupling 114) and stored in the storage vessel 202. Stated another way, the hydraulic fluid exiting the power split transmission coupling 114 can be high pressure hydraulic fluid.

The adjustable torque ratio of the power split transmission coupling 114 can be adjusted to provide a desired output shaft condition including but not limited to, an output shaft torque, power, rotational speed, or the like. The difference in the torque of the input shaft 302 and the torque of the output shaft 304 is proportional to the volume of high pressure hydraulic fluid diverted from the power split transmission coupling 114. For instance, the outlet port 306 can include an adjustable valve. An orifice of the adjustable valve can be adjusted to increase or decrease the flow rate of fluid flowing through the outlet port 306. Increasing the flowrate of hydraulic fluid through the outlet port 306 can decrease the amount of torque transferred from the input shaft 302 to the output shaft 304. In an example, the extension of the vane 406 can be controlled to achieve the desired output shaft condition. The position of the tip 412 of the vane 406 can be adjusted to a location flush with the outer surface 416 of the rotor hub 402, a location in contact with the cam ring 308, or any location therebetween. The adjustable torque ratio can be controlled by any number of mechanical or electromechanical devices including, but not limited to, an electric motor, servo, flow control valve, mechanical linkage, hydraulic motor, hydraulic system, pneumatic motor, pneumatic system, or the like. In an example, the adjustable torque ration can be controlled by a computer in communication with the electromechanical device.

In an example, the stored hydraulic fluid can be supplied under high pressure to a hydraulic motor 118 to increase the power produced by the generator 116. For instance, where the power applied to the generator rotor 120 is below the maximum rated power of the generator 116, additional power can be supplied to the generator 116 from the hydraulic motor 118. In an example, reducing the power transmitted to the generator rotor 120 can prevent damage to the generator 116 or prevent the oversupply of power to an electric grid and accordingly an undesired increase in the electrical frequency of the grid. In the power split mode, power generated by the turbine rotor 102 is not wasted by reducing the power transmitted to the generator 116. Instead, the excess power is stored as high pressure fluid to be used at another time or location, such as used to provide additional power to the generator 116 when tidal and/or wind speed is low or to provide additional power to another turbine operating below maximum production. In an example, the power split transmission coupling 114 can smooth the torque and/or power transmitted from the input shaft 302 to the output shaft 304. For instance, an inconsistent input shaft torque can be converted to a constant output shaft torque by the power split transmission coupling 114. In an example, the energy efficiency of the power split transmission coupling 114 can be 90% or greater. In comparison, a piston pump can have an energy efficiency of only 70%. The power split transmission coupling 114 can operate at power capacities over one megawatt, such as two megawatts, three megawatts, or more.

Thus, in summary, the power split transmission coupling includes an input shaft coupled to the turbine rotor. The input shaft can rotate in response to the rotor torque. The output shaft can rotate at an output speed. The power split coupling can include a cam ring and a rotor hub disposed between the input shaft and the output shaft. A hydraulic fluid can be disposed between the cam ring and the rotor hub. The rotor hub can include a plurality of circumferentially spaced slots configured to house a plurality of vanes therein. The vanes can be configured to be movable, such as between a retracted position, a fully extended position, or any partially extended position therebetween. In the retracted position, the input shaft is independently rotatable with respect to the output shaft. In the one or more extended positions, the plurality of vanes are configured to work the hydraulic fluid and transmit torque from the input shaft to the output shaft at an adjustable torque ratio. The power split transmission coupling includes an inlet port communicatively coupled to a hydraulic fluid source. The hydraulic fluid can be transported from the hydraulic fluid source to the power split transmission coupling. The power split transmission coupling can include an outlet port having a closed configuration and an at least partially open configuration. The hydraulic fluid can be released from the power split transmission coupling through the outlet port in response to a power applied to the output shaft exceeding a threshold power. The released hydraulic fluid can exit the power split transmission coupling and can be stored under pressure.

Tidal and/or wind conditions can be inconsistent, in an example, the power split transmission coupling can transmit a constant power to the generator during inconsistent tidal and/or wind conditions by adjusting the volume of hydraulic fluid diverted from the power slit transmission coupling. For instance, the power split transmission coupling can reduce tidal and/or wind jitter effects on the turbine system. The power split transmission coupling can operate at high volumetric efficiency thereby increasing the efficiency of power generation. In an example, mechanical braking or turbine blade adjustments may need to be applied in order to prevent the generator from receiving more than the maximum rated power. By diverting hydraulic fluid from the power split transmission coupling, the application of mechanical braking or the feathering of the turbine blades is unnecessary to prevent the generator from exceeding the maximum rated power.

In an example, the turbine can be operated in a power generation cycle and in a regeneration cycle. In the power generation cycle, the power split transmission coupling can be adjusted (e.g., by a computer controller) to transfer substantially all torque from the turbine rotor to the generator by working the hydraulic fluid. In response, the generator can convert mechanical power to electrical power. The power split transmission coupling can divert the hydraulic fluid at high pressure from the power split transmission coupling in response to the electrical power produced by the generator exceeding the threshold power. Diverting the hydraulic fluid can maintain the electrical power produced by the generator at or below the threshold. The hydraulic fluid diverted from the power split transmission coupling under high pressure can be stored in a storage vessel. In a regeneration cycle, the hydraulic fluid stored at high pressure can be introduced to a hydraulic motor in response to the generator producing below threshold power. The hydraulic motor can be configured to transmit mechanical power to the generator for electrical power generation. As a result, the generator can operate at or closer to maximum power output for a higher percentage of the life of the generator. For instance, tidal and/or wind conditions may not facilitate full power operation of the turbine during all periods of operation. The turbine can operate closer to the maximum operational power or maximum efficiency as a result of the regeneration mode.

It should be understood by one of ordinary skill in the art that the power applied to the generator is a function of the rotational speed of the generator rotor as well as the torque applied to the generator rotor and the electrical power load of the generator. Accordingly, one of ordinary skill would appreciate that examples discussed herein including electrical power or mechanical power terms can include examples of corresponding rotational speed, power, or torque. For instance, a system configured to operate below a threshold power can also include an equivalent example of the same system configured to operate below a threshold rotor speed corresponding to the threshold power value for a given system.

FIGS. 5A-5D illustrate a hydraulic vane device 500 according to another example. This hydraulic vane device 500 has a similar construction to that of the power split transmission coupling 114 of FIGS. 1-4 in that it can include a rotor hub 502 positioned within a cam ring 504. However, the hydraulic vane device 500 differs in that the cam ring 504 includes one or more inlet ports 506A, 506AA, 506B, 506BB, 506C, 506CC, 506D and 506DD (all illustrated in each of FIG. 5D), one or more outlet ports 508A, 508B, 508C and 508D (refer to FIG. 5D), and a cam ring surface 510.

FIGS. 5A-5D do not show a plurality of vanes 503 in an extended mode of operation engaging the cam ring surface 510 as would be the case in some modes of operation. It is understood that the vanes 503 would be capable of operation in any of the manners previously described and illustrated with regard to FIGS. 1-4.

Figure 5A:
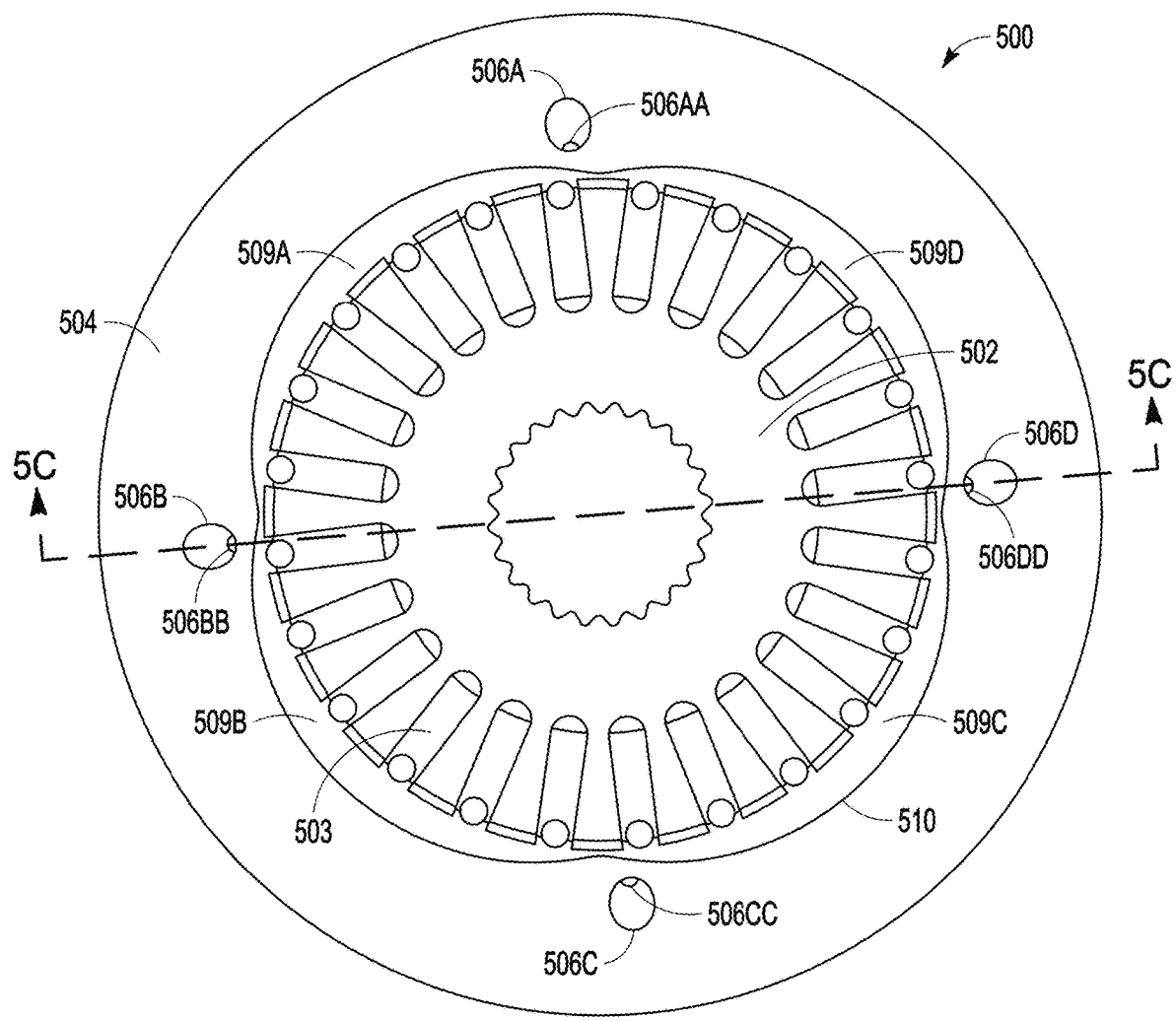
FIG. 5A is an axial end view of a hydraulic device that includes the multi-chamber ring according to an embodiment.
Figure 5B:
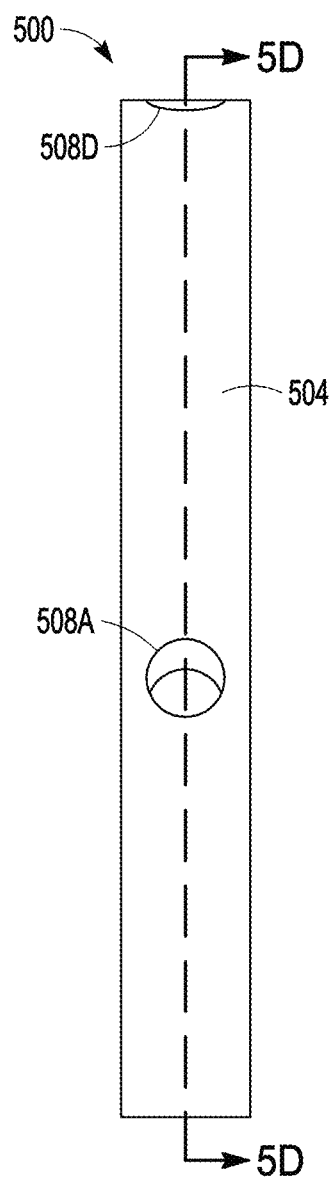
FIG. 5B is a side view of the hydraulic device of FIG. 5A.
Figure 5C:
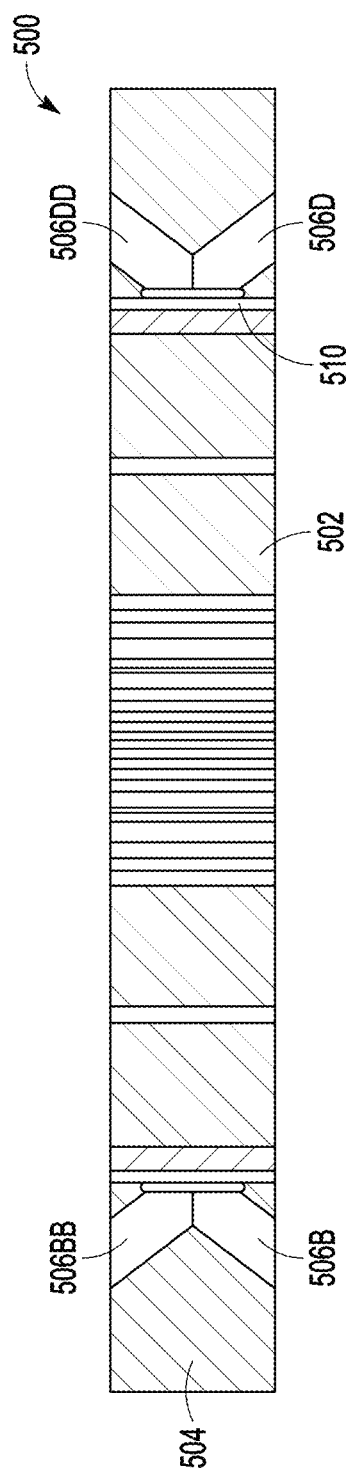
FIG. 5C is a second cross section view of the hydraulic device of FIGS. 5A and 5B.
Figure 5D:
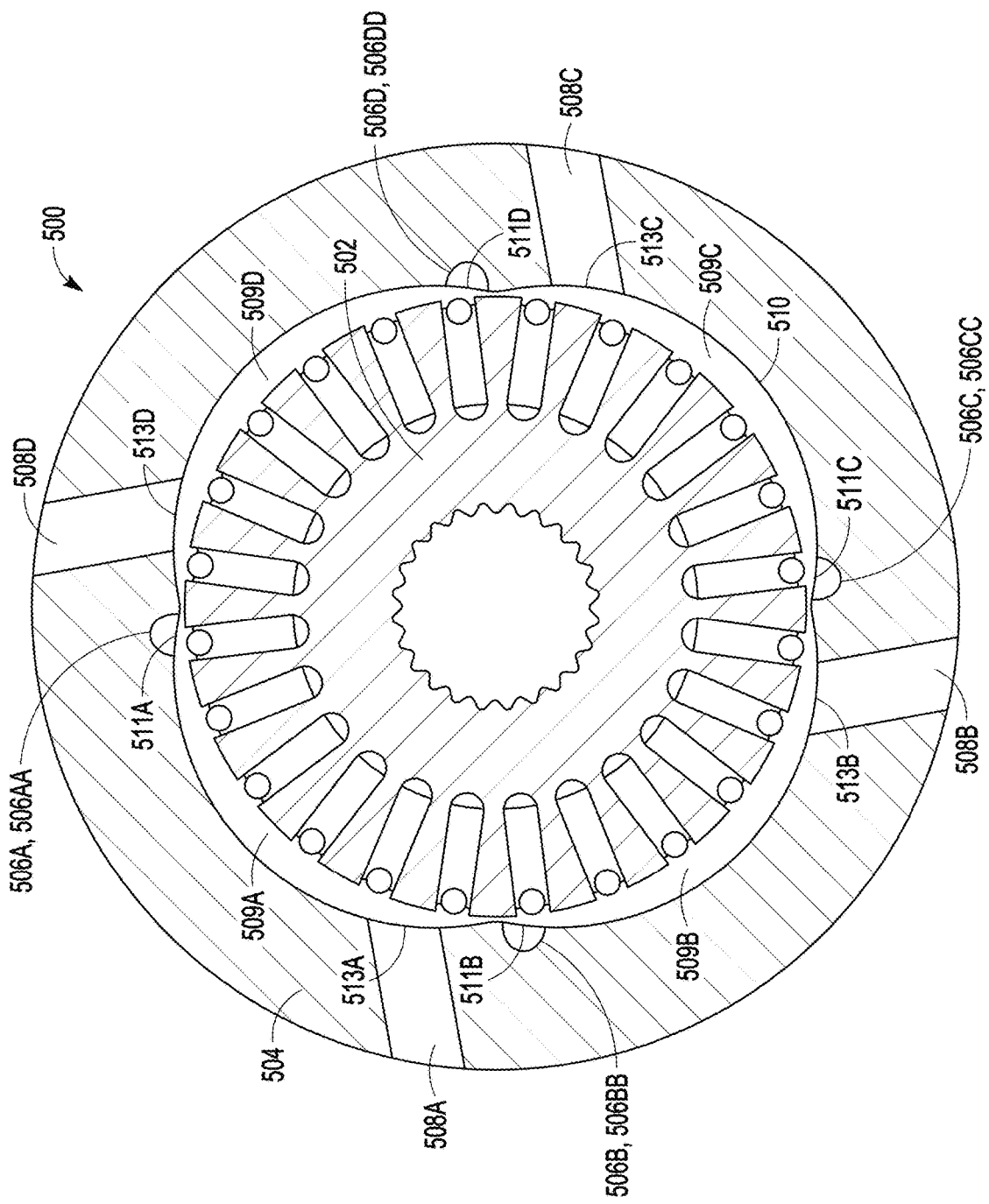
FIG. 5D is a third cross section view of the hydraulic device of FIGS. 5A-5C.

As shown in FIGS. 5A and 5D, the cam ring surface 510 can have a shape comprised of multiple interconnected elliptically shaped walls/surfaces. These elliptically shaped walls/surfaces form part of an interior of the hydraulic vane device 500 and can provide the hydraulic vane device with four chambers 509A, 509B, 509C and 509D (shown in FIGS. 5A and 5D). These chambers 509A, 509B, 509C and 509D can be defined by the cam ring surface 510 and the rotor hub 502.

As shown variously in at least one of FIGS. 5A, 5B and 5D, the one or more inlet ports 506A, 506AA, 506B, 506BB, 506C, 506CC, 506D and 506DD can extend inward from an outer portion (e.g. a first axial end 512A, a second axial end 512B, and/or an outer radial edge 514) of the cam ring 504. The number of the one or more inlet ports 506A, 506AA, 506B, 506BB, 506C, 506CC, 506D and 506DD is purely exemplary and can be modified as desired. The one or more inlet ports 506A, 506AA, 506B, 506BB, 506C, 506CC, 506D and 506DD can divide or combine into conduits/passageways/cavities that communicate with one of the one or more of the chambers 509A, 509B, 509C and 509D. Each of the one or more inlet ports 506A, 506AA, 506B, 506BB, 506C, 506CC, 506D and 506DD can extend to the cam ring surface 510. As shown in FIG. 5D, the one or more inlet ports 506A, 506AA can communicate with the chamber 509A at a first aperture or port 511A in the cam ring surface 510 located in a first quadrant of the hydraulic vane device 500. Similarly, the one or more inlet ports 506B, 506BB can communicate with the chamber 509B at a second aperture or port 511B in the cam ring surface 510 located in a second quadrant of the hydraulic vane device 500. The one or more inlet ports 506C, 506CC can communicate with the chamber 509C at a third aperture or port 511C in the cam ring surface 510 located in a third quadrant of the hydraulic vane device 500. The one or more inlet ports 506D, 506DD can communicate with the chamber 509D at a fourth aperture or port 511D in the cam ring surface 510 located in a fourth quadrant of the hydraulic vane device 500.

As shown in FIGS. 5B and 5D, the one or more outlet ports 508A, 508B, 508C and 508D can extend inward from the outer portion (e.g. the outer radial edge 514) of the cam ring 504. The number of the one or more outlet ports 508A, 508B, 508C and 508D is purely exemplary and can be modified as desired. These one or more outlet ports 508A, 508B, 508C and 508D can extend as conduits, cavities or passageways that communicate with one or more of the chambers 509A, 509B, 509C and 509D. Each of the one or more outlet ports 508A, 508B, 508C and 508D can extend to the cam ring surface 510. As shown in FIG. 5D, the one or more outlet ports 508A can communicate with the chamber 509A at a first aperture or port 513A in the cam ring surface 510 located in a first quadrant of the hydraulic vane device 500. Similarly, the one or more one or more outlet ports 508B can communicate with the chamber 509B at a second aperture or port 513B in the cam ring surface 510 located in a second quadrant of the hydraulic vane device 500. The one or more outlet ports 508C can communicate with the chamber 509C at a third aperture or port 513C in the cam ring surface 510 located in a third quadrant of the hydraulic vane device 500. The one or more outlet ports 508D can communicate with the chamber 509D at a fourth aperture or port 513D in the cam ring surface 510 located in a fourth quadrant of the hydraulic vane device 500.

Thus, as illustrated in the example of FIGS. 5A-5D, the hydraulic vane device 500 can have at least four chambers 509A, 509B, 509C and 509D and at least eight internal ports 511A, 511B, 511C, 511D, 513A, 513B, 513C and 513D. However, it should be noted that the embodiment of FIGS. 5A-5D is exemplary and according to further embodiments five chambers, six chambers (see FIG. 7), seven chambers, eight chambers, or more are contemplated. Similarly, ten internal ports, twelve internal ports, fourteen internal ports, sixteen internal ports, or more are contemplated. Some of these internal ports can be located axially relative to the vanes rather than radially outward as illustrated.

Figure 6:
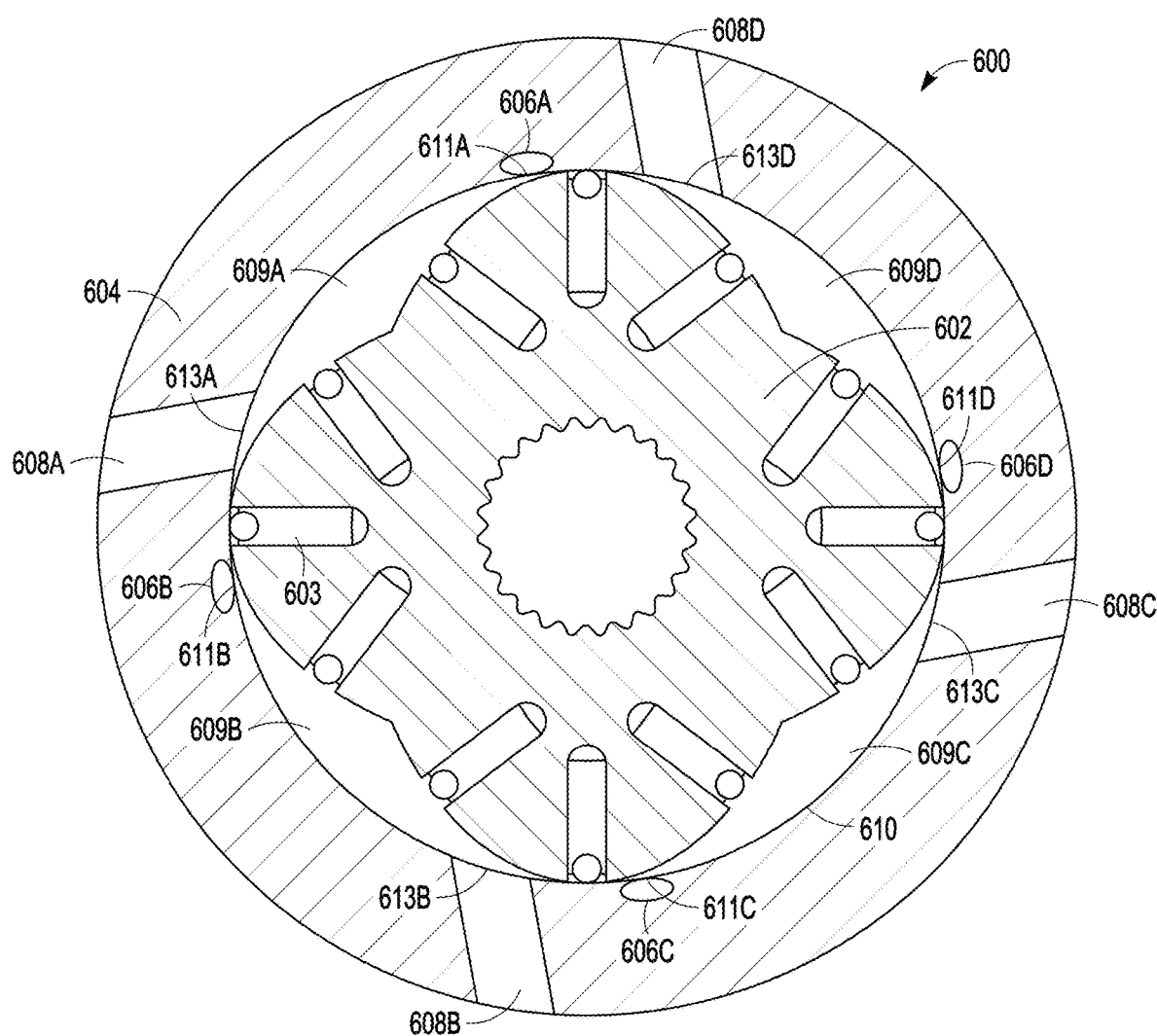
FIG. 6 is a cross section view of another hydraulic device that includes the multi-chamber ring according to an embodiment.

FIG. 6 illustrates a hydraulic vane device 600 according to another example. This hydraulic vane device 600 has a similar construction to that of the hydraulic vane device 500 in that it can include multiple chambers between a rotor hub 602 and a cam ring 604. However, the hydraulic vane device 600 differs from the hydraulic vane device 500 in that the rotor hub 602 has lobes 602A, 602B, 602C and 602D (i.e. is non-circular along an outer circumference). This lobed configuration along the outer circumference of the rotor hub 602 can give the outer circumference, when viewed in cross-section, a shape comprised of multiple interconnected elliptically shaped walls/surfaces. The cam ring 604 can be altered from that of the cam ring 504 in that cam ring surface 610 is circular in cross-section and does not have the plurality of ellipses as was the case with the cam ring surface 510.

The cam ring 604 can include one or more inlet ports 606A, 606B, 606C and 606D and one or more outlet ports 608A, 608B, 608C and 608D, and the cam ring surface 610. These can be constructed in the manner similar to those previously described with respect to the example of FIGS. 5A-5D with the exception noted above that cam ring surface 610 differs in shape from that of the cam ring surface 510.

FIG. 6 does not show a plurality of vanes 603 in an extended mode of operation engaging the cam ring surface 610 as would be the case in some modes of operation. It is understood that the vanes 603 would be capable of operation in any of the manners previously described and illustrated with regard to FIGS. 1-4.

Due to the lobed shape of the rotor hub 602 (i.e., having the multiple interconnected elliptically shaped walls/surfaces in cross-section), The rotor hub 602 forms an interior of the hydraulic vane device 600 and can provide the hydraulic vane device 600 with four chambers 609A, 609B, 609C and 609D. These chambers 609A, 609B, 609C and 609D can be defined by the cam ring surface 610 and the rotor hub 602.

As shown in FIG. 6, the one or more inlet ports 606A, 606B, 606C, and 606D can extend inward from an outer portion (e.g. a first axial end (not shown), a second axial end (not shown), and/or an outer radial edge 614) of the cam ring 604. The one or more inlet ports 606A, 606B, 606C, and 606D can divide or combine into conduits/passageways/cavities that communicate with one of the one or more of the chambers 609A, 609B, 609C and 609D. Each of the one or more inlet ports 606A, 606B, 606C, and 606D can extend to the cam ring surface 610. As shown in FIG. 6, the one or more inlet ports 606A can communicate with the chamber 609A at a first aperture or port 611A in the cam ring surface 610 located in a first quadrant of the hydraulic vane device 600. Similarly, the one or more inlet ports 606B can communicate with the chamber 609B at a second aperture or port 611B in the cam ring surface 610 located in a second quadrant of the hydraulic vane device 600. The one or more inlet ports 606C can communicate with the chamber 609C at a third aperture or port 611C in the cam ring surface 610 located in a third quadrant of the hydraulic vane device 600. The one or more inlet ports 606D can communicate with the chamber 609D at a fourth aperture or port 611D in the cam ring surface 610 located in a fourth quadrant of the hydraulic vane device 600.

As shown in FIG. 6, the one or more outlet ports 608A, 608B, 608C and 608D can extend inward from the outer portion (e.g. the outer radial edge 614) of the cam ring 604. These one or more outlet ports 608A, 608B, 608C and 608D can extend as conduits, cavities or passageways that communicate with one of the one or more of the chambers 609A, 609B, 609C and 609D. Each of the one or more outlet ports 608A, 608B, 608C and 608D can extend to the cam ring surface 610. As shown in FIG. 6, the one or more outlet ports 608A can communicate with the chamber 609A at a first aperture or port 613A in the cam ring surface 610 located in a first quadrant of the hydraulic vane device 600. Similarly, the one or more one or more outlet ports 608B can communicate with the chamber 609B at a second aperture or port 613B in the cam ring surface 610 located in a second quadrant of the hydraulic vane device 600. The one or more outlet ports 608C can communicate with the chamber 609C at a third aperture or port 613C in the cam ring surface 610 located in a third quadrant of the hydraulic vane device 600. The one or more outlet ports 608D can communicate with the chamber 609D at a fourth aperture or port 613D in the cam ring surface 610 located in a fourth quadrant of the hydraulic vane device 600.

Thus, as illustrated in the example of FIG. 6, the hydraulic vane device 600 can have at least four chambers 609A, 609B, 609C and 609D and at least eight internal ports 611A, 611B, 611C, 611D, 613A, 613B, 613C and 613D. However, it should be noted that the embodiment of FIG. 6 is exemplary and according to further embodiments five chambers, six chambers (see FIG. 7), seven chambers, eight chambers, or more are contemplated. Similarly, ten internal ports, twelve internal ports, fourteen internal ports, sixteen internal ports, or more are contemplated.

Figure 7:
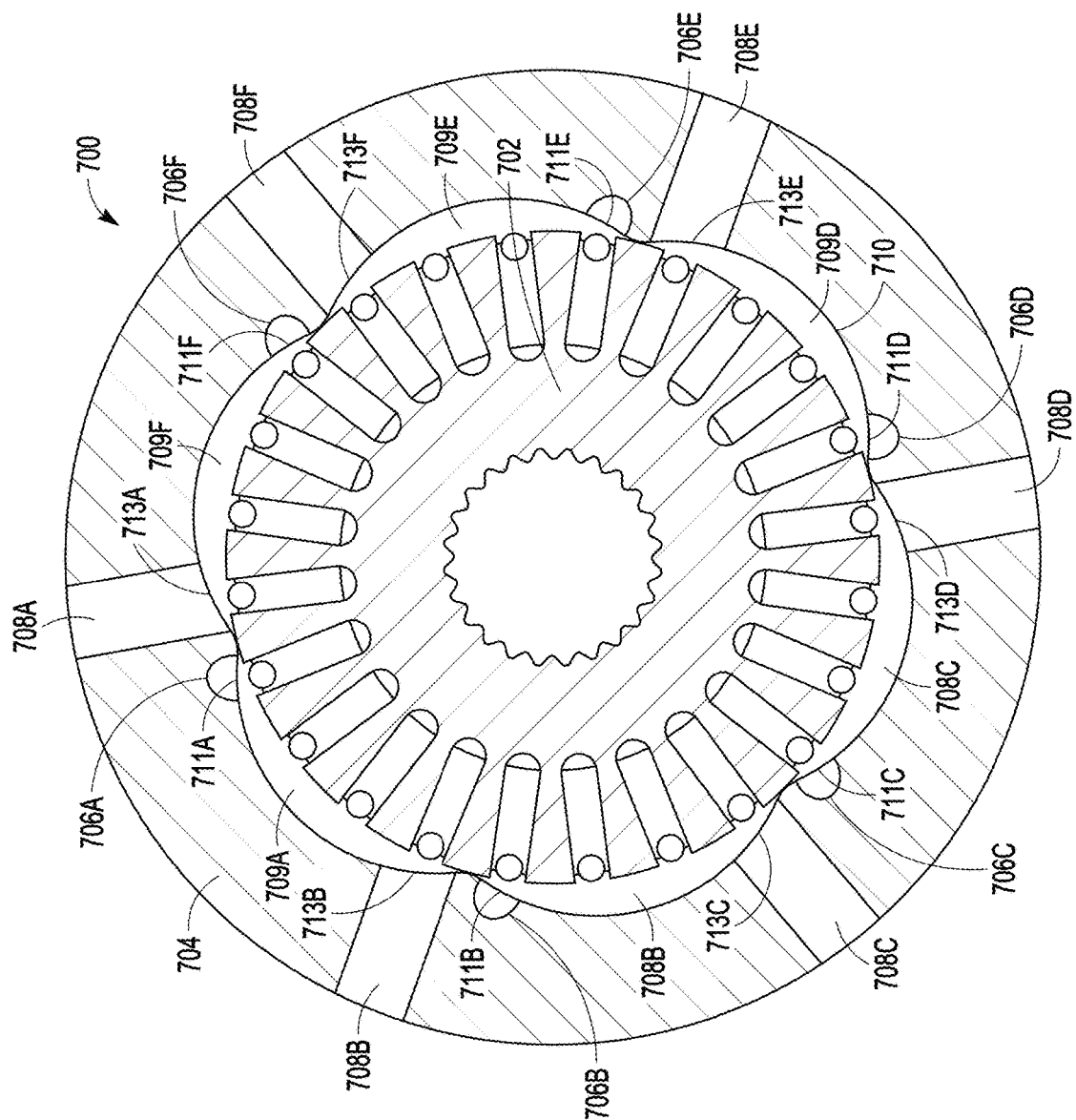
FIG. 7 is a cross section view of yet another hydraulic device that includes a multi-chamber rotor according to an embodiment.

FIG. 7 illustrates a hydraulic vane device 700 according to another example. This hydraulic vane device 700 has a similar construction to that of the hydraulic vane device 500 in that it can include multiple chambers between a rotor hub 702 and a cam ring 704. However, the hydraulic vane device 700 differs from the hydraulic vane device 700 in that a cam ring surface 710 of the cam ring 704 can have a shape comprised of more multiple interconnected elliptically shaped walls/surfaces. These elliptically shaped walls/surfaces form a part of an interior of the hydraulic vane device 700 and can provide the hydraulic vane device 700 with six chambers 709A, 709B, 709C, 709D, 709E and 709F. These chambers 709A, 709B, 709C, 709D, 709E and 709F can be defined by the cam ring surface 710 and the rotor hub 702.

The cam ring 704 can include one or more inlet ports 706A, 706B, 706C, 706D, 706E and 706F and one or more outlet ports 708A, 708B, 708C, 708D, 708E and 708F and the cam ring surface 710. These can be constructed in the manner similar to those previously described with respect to the example of FIGS. 5A-5D.

The one or more inlet ports 706A, 706B, 706C, 706D, 706E and 706F can extend inward from an outer portion (e.g. a first axial end (not shown), a second axial end (not shown), and/or an outer radial edge 714) of the cam ring 704. The one or more inlet ports 706A, 706B, 706C, 706D, 706E and 706F can divide or combine into conduits/passageways/cavities that communicate with one of the one or more of the chambers 709A, 709B, 709C, 709D, 709E and 709F. Each of the one or more inlet ports 706A, 706B, 706C, 706D, 706E and 706F can extend to the cam ring surface 710. As shown in FIG. 7, the one or more inlet ports 706A can communicate with the chamber 709A at a first aperture or port 711A in the cam ring surface 710. Similarly, the one or more inlet ports 706B can communicate with the chamber 709B at a second aperture or port 711B in the cam ring surface 710. The one or more inlet ports 706C can communicate with the chamber 709C at a third aperture or port 711C in the cam ring surface 710. The one or more inlet ports 706D can communicate with the chamber 709D at a fourth aperture or port 711D in the cam ring surface 710. The one or more inlet ports 706E can communicate with the chamber 709E at a fifth aperture or port 711E in the cam ring surface 710. The one or more inlet ports 706F can communicate with the chamber 709F at a sixth aperture or port 711F in the cam ring surface 710.

As shown in FIG. 7, the one or more outlet ports 708A, 708B, 708C, 708D, 708E and 708F can extend inward from the outer portion (e.g. the outer radial edge 714) of the cam ring 704. These one or more outlet ports 708A, 708B, 708C, 708D, 708E and 708F can extend as conduits, cavities or passageways that communicate with one of the one or more of the chambers 709A, 709B, 709C, 709D, 709E and 709F. Each of the one or more outlet ports 708A, 708B, 708C, 708D, 708E and 708F can extend to the cam ring surface 710. As shown in FIG. 6, the one or more outlet ports 708A can communicate with the chamber 709A at a first aperture or port 713A in the cam ring surface 710. Similarly, the one or more one or more outlet ports 708B can communicate with the chamber 709B at a second aperture or port 713B in the cam ring surface 710. The one or more outlet ports 708C can communicate with the chamber 709C at a third aperture or port 713C in the cam ring surface 710. The one or more outlet ports 708D can communicate with the chamber 709D at a fourth aperture or port 713D in the cam ring surface 710. The one or more outlet ports 708E can communicate with the chamber 709E at a fifth aperture or port 713E in the cam ring surface 710. The one or more outlet ports 708F can communicate with the chamber 709F at a sixth aperture or port 713F in the cam ring surface 710.

As illustrated in the example of FIG. 7, the hydraulic vane device 700 can have at least six chambers 709A, 709B, 709C, 709D, 709E and 709F and at least twelve internal ports 711A, 711B, 711C, 711D, 711E, 711F, 713A, 713B, 713C, 713D, 713E and 713F. However, it should be noted that the embodiment of FIG. 7 is exemplary and according to further embodiments with different numbers of chambers and different numbers of internal ports are contemplated.

Figure 8:
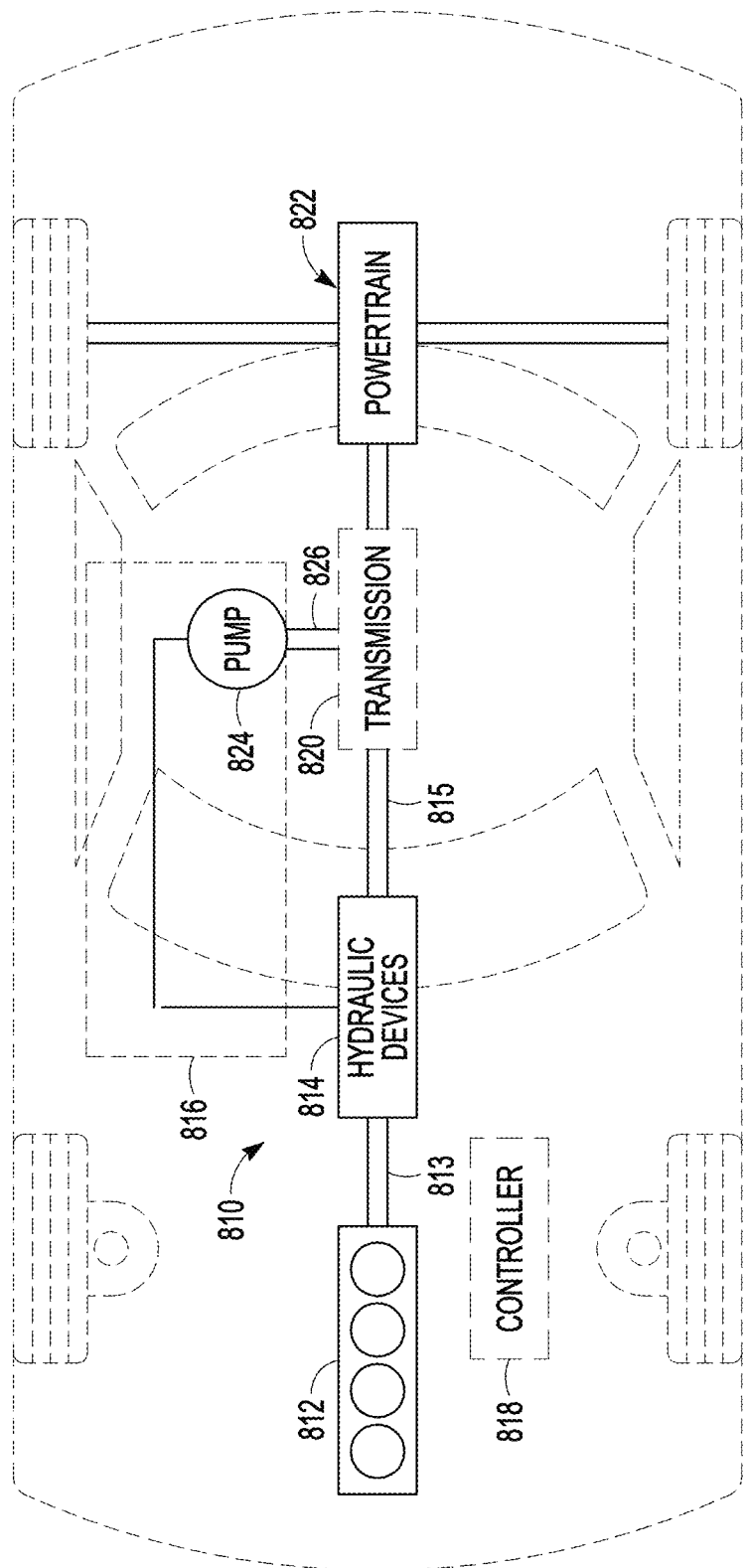
FIG. 8 is a schematic view of a vehicle including a vehicle system having a hydraulic device and one or more accessories according to an embodiment of the present application.

FIG. 8 shows another system 800 that can potentially be improved with the hydraulic vane devices of FIGS. 5A-7 having the multi-chamber configuration. FIG. 8 is a highly schematic view of the system 800 aboard a vehicle. The system 800 can include a torque source 812, an input shaft 813, at least one hydraulic device 814, an output shaft 815, a plurality of accessories 816, a controller 818, a transmission 820, and a power train 822. The plurality of accessories 816 can include a pump motor 824 and one or more output shafts 826.

Figure 9:
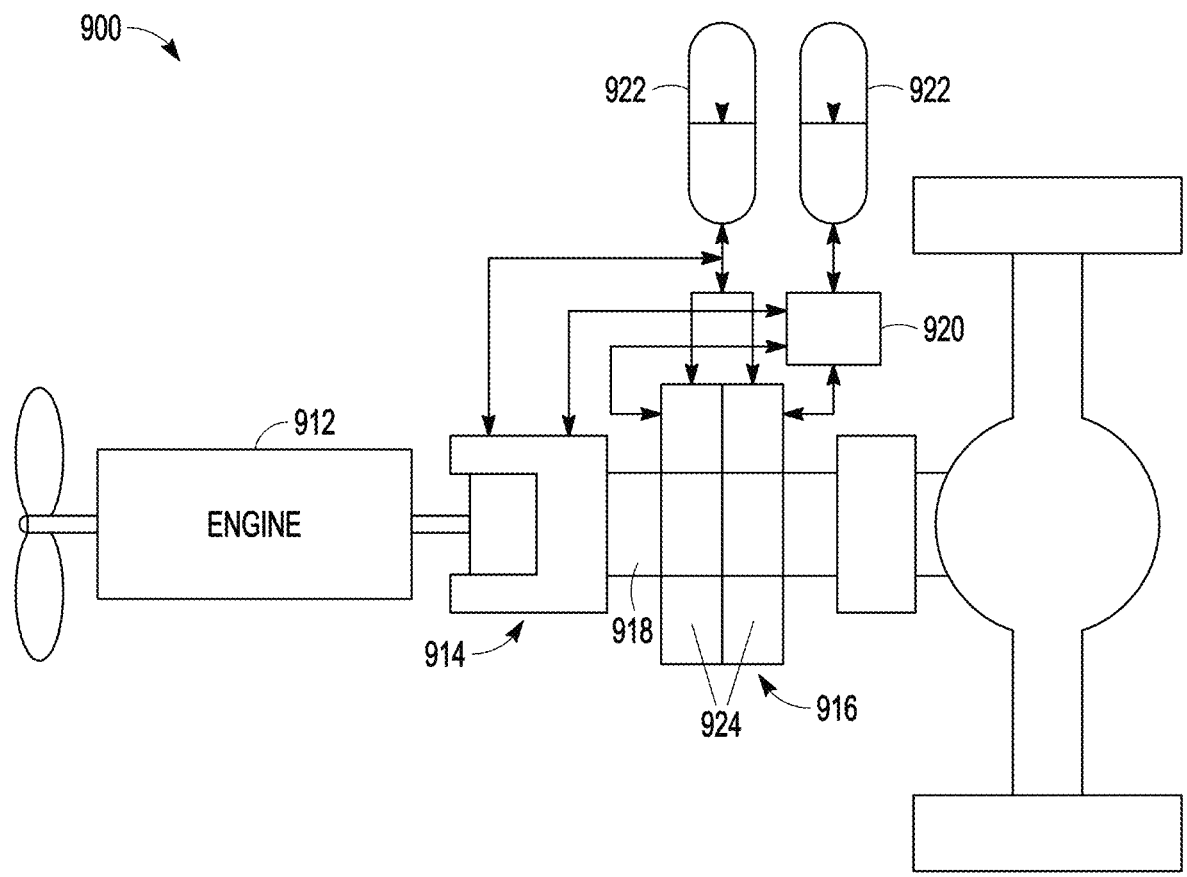
FIG. 9 is a schematic view of a second vehicle including a second vehicle system having the hydraulic device and one or more accessories according to an embodiment of the present application.

The illustration of FIG. 8 represents one possible configuration (e.g., with the hydraulic vane device 814 disposed before the transmission 820 and with output shafts 815 (including shaft 826) coupled to the transmission 820). Other configurations are possible. The torque source 812 can comprise any source including, but not limited to, an engine, a flywheel, an electric motor, etc. The torque source 812 can be coupled the input shaft 813 of the hydraulic device 814. The torque source 812 can be configured to outputs torque/power to the hydraulic device 814 according to many operation modes. These operational modes are discussed in my prior patent applications, which have been incorporated herein by reference. However, in some cases the hydraulic device 814 can act as a starter motor as shown in FIG. 9 to input torque/power to the torque source 812 (e.g., if the torque source is an engine it can be turned at some speed, so that it sucks fuel and air into the cylinders, and compresses it) in the startup mode. The hydraulic device 814 can selectively transmit the torque/power of the torque source 812 via the output shaft 815 to the transmission 820 or another power train 822 system. Although not illustrated in FIG. 8, the hydraulic devices 14 can be intelligently controlled by pilot signal(s), valve(s), etc. to selectively transmit power/torque or utilize the power/torque for pumping a hydraulic fluid to or from the plurality of vehicle accessories 816. The controller 818 (e.g. vehicle ECU) can be configured to communicate with various systems and components of the system 810 and vehicle and can be operable to control the system operation mode based on a plurality of vehicle operation parameters (e.g. start, deceleration, acceleration, vehicle speed, desire or need to operate various auxiliary systems including hydraulically powered systems, etc.).

FIG. 8 illustrates an example where the hydraulic vane device 814 is in fluid communication with the plurality of accessories 816. FIG. 8 illustrates one of the accessories 816, the pump motor 824, which is coupled to the transmission 820 by the output shaft 826. According to additional examples, the plurality of accessories 816 can comprise, for example, an accumulator, and/or one or more auxiliary systems (e.g., systems for cooling fan drives, dump boxes, power steering, compressor systems, alternator systems, braking systems, fire suppression systems, hydraulic equipment related systems, etc.).

In one example, the pump motor 824 can comprise a digitally controlled piston pump. The pump motor 824 can be controlled by various methods including, but not limited to, electronically, pressure compensated, lever, or digitally. The pump motor 824 is coupled to the transmission 820 by the output shaft 826 (e.g., part of shaft 815) and can receive torque from or apply torque to the transmission 820. According to one example, the hydraulic pump motor 824 can include a port in fluid communication with the discharge pressure of the hydraulic device 814. According to one mode of system operation, the pump motor 824 can receive hydraulic fluid at the discharge pressure from one or more of the hydraulic devices 814 to propel the transmission 820. The pump motor 824 can be stroked on slightly or fully in this condition; the degree of stroke is inconsequential as there can be little inlet port pressure.

In general, the hydraulic vanes devices 814 can have the construction further discussed and illustrated in this application including a rotor body and at least a first vane configured for movement relative to the rotor body. The hydraulic device 814 can be adapted to retain the first vane in a retracted vane mode of operation and to release (and/or extend) the first vane in a vane extended mode of operation in which the first vane extends to hydraulically work fluid when the first vane is moved with respect to the rotor body. The input shaft 813 and the output shaft 815 can coupled to rotate together in the vane extended mode of operation (i.e. the hydraulic devices operate as hydraulic couplings) if the output shaft 815 is not fixed or has sufficient resistance to couple. In other operation modes, the input shaft 813 and output shaft 815 can be free to rotate with respect to one another in a vane extended mode of operation (i.e. the hydraulic devices operate as vane pumps) if the output shaft 815 is either fixed or has does not create sufficient resistance to entirely couple.

According to the example of in FIG. 8, one or more of the hydraulic vane devices 814 can operate as a hydraulic pump, and thus, operates as part of a hydraulic system for the vehicle. Various intelligent controls (electronic, pressure compensated, lever, and/or digital) of valves, bleed valves, components, etc. can be utilized to control the direction and amount of hydraulic fluid to and from the plurality of accessories 816 and the plurality of hydraulic devices 814. The present systems benefit from precise control. For example, programmable torque settings affected by adjustment of the pressure relief setting result in predetermined stall points. Such programmable stall points can be either fixed or remotely set by associating relief valve setting with a remote conventional override relief valve. A further benefit of precise control can be controlled acceleration or deceleration by varying relief valve settings to match desired maximum torques. In such embodiments, start and stop torques can be reduced to limit high peak torque levels that can damage machinery.

According to further examples, the controller 818 can operate as a remote pressure control. In some examples, the remote pressure control is coupled to one side of a balance piston, with pump output in fluid communication with the opposite side of the balance piston. The balance piston is to control whether the hydraulic device can pump hydraulic fluid. For example, if the remote pressure control is set to a pressure, the balance piston allows coupling discharge pressure to rise until the device discharge pressure is higher than the pressure, moving the balance piston to overcome the remote pressure control pressure. As the balance piston moves, it enables the device discharge to drain, such as to tank. In such a manner, the maximum torque transmitted is remotely controllable via the remote pressure control signal. In some examples, the remote pressure control is used in addition to a primary relief valve that allows hydraulic fluid to pump in any case where a torque differential between the input shaft 813 and the output shaft 815 exceeds a predetermined threshold.

FIG. 9 illustrates a system 900 schematically with a hydraulic vane device 914 coupled to a torque source 912 for starter motor function. The hydraulic device 914 can comprise any of the hydraulic vane devices previously or subsequently described. Thus, according to some cases the hydraulic vane device 914 can include multiple chambers as previously described. The hydraulic vane device 914 can include retainers configured to retain and capture the vanes that form working surfaces that would, in a vane extended mode, work hydraulic fluid through the couple. In various examples, a pilot signal is used to control the retainers and/or other components of the system 900 as further discussed herein. The system 900 can optionally include two or more devices 916 such as two hydraulic pump motors 924 as previously described. The two or more devices 916 can also comprise any type of starter motor know in the art. According to further examples, the two or more devices 916 can be two or more hydraulic vane devices each configured for operation as a starter motor as further illustrated and described in my U.S. Provisional Patent Application Ser. No. 62/945,946, entitled "HYDRAULIC DEVICE CONFIGURED AS A STARTER MOTOR", filed Dec. 10, 2019, the entire specification of each of which is incorporated herein by reference in entirety.

The two or more devices 916 can be coupled to an output shaft 918 in series and the output shaft 918 can be coupled for rotation with a ring or rotor of the hydraulic device 914. As discussed previously and subsequently, the hydraulic device 914 can be one or more hydraulic vane devices such as those known in the art and incorporated by reference or disclosed herein with multiple (four or more) chambers. The hydraulic device 914 can be configured for operation as a power split coupling, a hydraulic motor, and/or a starter motor, for example.

According to the example of FIG. 9, the system 900 includes a valve 920 to control fluid communication within parts of the system 900. Optionally, one, two or more accumulators 922 comprising one of the accessories contemplated previously discussed in FIG. 8 can store pressurized fluid and can be used in various operation modes including in starter motor operation mode, energy capture mode (e.g., capturing energy during engine braking, conventional braking, or down hill), regenerative energy application mode (e.g., torque boost mode for driving into heap when in loading using power split coupling as a pump, etc.) and other modes discussed herein. Regenerative energy application mode can utilize the valve 920 to meter energy from one or more of the accumulators 922.

The system 900 can utilize multiple hydraulic vane devices 914 and/or 916. Some or all of these hydraulic vane devices 914 and/or 916 can have multi-chamber configurations as disclosed herein. Each hydraulic vane device 914 and/or 916 can have different displacements as a result of the chambers being different sizes. This can improve hydraulic flexibility of the system 900 as each device and/or chamber can provide for a different displacement. For example, the system 900 can switch to one chamber of appropriate size and pressure as the pressure rises therein to help charge an accessory such as one or more of the accumulators 922. According to another example, two or more chambers (from different devices or on the same device) could be utilized simultaneously as pumps for certain operations such as breaking into the heap or dumping the load.

As used herein "hydraulic fluid" is not limited to oil but can include glycol, water-glycol, water and other suitable fluids.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventor also contemplate examples in which only those elements shown or described are provided. Moreover, the present inventor also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A hydraulic device comprising:
   a rotor disposed for rotation about an axis;
   a plurality of vanes, each of the plurality of vanes moveable relative to the rotor between a retracted position and an extended position where the plurality of vanes work a hydraulic fluid introduced adjacent the rotor; and
   a ring disposed around at least a portion of the rotor, wherein the ring or rotor are shaped and positioned to define four or more chambers therebetween, wherein the outer surface of the rotor is lobed having multiple interconnected elliptically shaped surfaces in cross-section.

2. The hydraulic device of claim 1, wherein the ring comprises:
   at least one suction cavity and at least one pressure cavity, wherein the at least one suction cavity and the at least one pressure cavity are configured for ingress and egress of a hydraulic fluid through the ring;

at least four suction ports at an inner cam surface of the ring and in fluid communication with the at least one suction cavity, wherein each of the at least four suction ports is configured to receive hydraulic fluid from one of the four or more chambers defined between the rotor and the ring; and at least four pressure ports at the inner cam surface of the ring and in fluid communication with the at least one pressure cavity, wherein each of the at least four pressure ports is configured to allow for passage of the hydraulic fluid from the at least one pressure cavity to one of the four or more chambers defined between the ring and the rotor.

3. The hydraulic device of claim 1, wherein the hydraulic device has at least eight ports allowing for ingress and egress of the hydraulic fluid to or from the four or more chambers.

4. The hydraulic device of claim 1, wherein an inlet port of one of the four or more chambers is adjacent an outlet port of an adjacent second of the four or more chambers.

5. The hydraulic device of claim 1, wherein the hydraulic device has six chambers.

6. The hydraulic device of claim 1, wherein the plurality of vanes are configured to be positionally locked within the ring.

7. The hydraulic device of claim 1, wherein the hydraulic device is configured as a starter motor.

8. A system comprising:
a hydraulic device, the hydraulic device comprising:
a rotor disposed for rotation about an axis;
a plurality of vanes, each of the plurality of vanes moveable relative to the rotor between a retracted position and an extended position where the plurality of vanes work a hydraulic fluid introduced adjacent the rotor; and
a ring disposed at least partially around the rotor, wherein the ring or rotor together provide for four or more chambers defined between the rotor and the ring, wherein the outer surface of the rotor is lobed having multiple interconnected elliptically shaped surfaces in cross-section;
a torque generating device coupled to one of the ring or the rotor; and
an energy storage device in fluid communication with the hydraulic device, wherein the hydraulic device is selectively operable as a starter motor for the torque generating device using the hydraulic fluid supplied from the energy storage device.

9. The system of claim 8, wherein energy storage device comprises an accumulator.

10. The system of claim 8, wherein the ring comprises:
at least one suction cavity and at least one pressure cavity, wherein the at least one suction cavity and the at least one pressure cavity are configured for ingress and egress of a hydraulic fluid through the ring;

at least four suction ports at an inner cam surface of the ring and in fluid communication with the at least one suction cavity, wherein each of the at least four suction port is configured to receive hydraulic fluid from one of the four or more chambers defined between the rotor and the ring; and at least four pressure ports at the inner cam surface of the ring and in fluid communication with the pressure cavity, wherein each of the at least four pressure ports is configured to allow for passage of the hydraulic fluid from the at least one pressure cavity to one of the four or more chambers defined between the ring and the rotor.

11. The system of claim 8, wherein the hydraulic device has at least eight ports allowing for ingress and egress of the hydraulic fluid to or from the four or more chambers.

12. The system of claim 8, further comprising a controller operable to control a system operation mode based on a plurality of vehicle operation parameters.

13. A system comprising:
a hydraulic device, the hydraulic device comprising:
a rotor disposed for rotation about an axis;
a plurality of vanes, each of the plurality of vanes moveable relative to the rotor between a retracted position and an extended position where the plurality of vanes work a hydraulic fluid introduced adjacent the rotor; and
a ring disposed at least partially around the rotor, wherein the ring or rotor together provide for four or more chambers defined between the rotor and the ring;
a torque generating device coupled to one of the ring or the rotor, and
an energy storage device in fluid communication with the hydraulic device, wherein the hydraulic device is selectively operable as a starter motor for the torque generating device using the hydraulic fluid supplied from the energy storage device, wherein the system includes a plurality of hydraulic devices each have four or more chambers defined between the rotor and the ring, and wherein the four or more chambers of one of the plurality of hydraulic devices differs in size than the four or more chambers of another of the plurality of hydraulic devices.

14. The system of claim 13, wherein at least one of the plurality of hydraulic devices is configured as a starter motor for the torque generating device.

15. The system of claim 8, wherein a fluid communicating interior portion of the hydraulic device is coated in a diamond or diamond-like carbon, and wherein the hydraulic fluid comprises glycol or water-glycol.

16. The system of claim 8, wherein the torque generating device comprises one or more of a wind turbine, a tidal turbine, a motor, an engine or a flywheel.

* * * * *

UNITED STATES PATENT AND TRADEMARK OFFICE
CERTIFICATE OF CORRECTION

Page 1 of 1

PATENT NO. : 12,196,085 B2
APPLICATION NO. : 18/026521
DATED : January 14, 2025
INVENTOR(S) : Norman Ian Mathers It is certified that error appears in the above-identified patent and that said Letters Patent is hereby corrected as shown below:

In the Claims

In Column 22, Line 33, in Claim 13, delete "rotor," and insert --rotor;-- therefor Signed and Sealed this
Fourth Day of March, 2025

Coke Morgan Stewart
*Acting Director of the United States Patent and Trademark Office*